United States Patent
Iwai et al.

(10) Patent No.: US 12,483,366 B2
(45) Date of Patent: Nov. 25, 2025

(54) TERMINAL, BASE STATION, AND COMMUNICATION METHOD FOR APERIODIC TRANSMISSION OF REFERENCE SIGNALS

(71) Applicant: Panasonic Intellectual Property Corporation of America, Torrance, CA (US)

(72) Inventors: Takashi Iwai, Ishikawa (JP); Ayako Horiuchi, Kanagawa (JP); Akihiko Nishio, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 389 days.

(21) Appl. No.: 18/004,906

(22) PCT Filed: Jun. 22, 2021

(86) PCT No.: PCT/JP2021/023670
§ 371 (c)(1),
(2) Date: Jan. 10, 2023

(87) PCT Pub. No.: WO2022/014281
PCT Pub. Date: Jan. 20, 2022

(65) Prior Publication Data
US 2023/0291520 A1    Sep. 14, 2023

(30) Foreign Application Priority Data
Jul. 15, 2020   (JP) ................................ 2020-121432

(51) Int. Cl.
*H04W 72/04*    (2023.01)
*H04L 5/00*    (2006.01)
(Continued)

(52) U.S. Cl.
CPC .................................. *H04L 5/0048* (2013.01)

(58) Field of Classification Search
USPC ................................................. 370/329
See application file for complete search history.

(56) References Cited

U.S. PATENT DOCUMENTS

2024/0014971 A1*   1/2024   Zheng ................... H04L 5/0053
2024/0031097 A1*   1/2024   Go ......................... H04L 5/0094

FOREIGN PATENT DOCUMENTS

EP          2579490 A2    4/2013
WO   WO 2011100466 A2   8/2011

OTHER PUBLICATIONS

Extended European Search Report, dated Dec. 12, 2023, for European Patent Application No. 21842715.1-1213. (8 pages).
(Continued)

*Primary Examiner* — Maharishi V Khirodhar
(74) *Attorney, Agent, or Firm* — Seed Intellectual Property Law Group LLP

(57) ABSTRACT ne present invention improves reference signal transmission efficiency. A terminal is equipped with: a reception circuit for receiving information indicating some of a plurality of candidate unit-time resources for non-periodic transmission of reference signals; and a control circuit for, on the basis of the information, controlling the allocation of time resources to be used in the transmission of reference signals.

7 Claims, 17 Drawing Sheets

(51) Int. Cl.
H04W 76/00 (2018.01)
H04W 88/08 (2009.01)

(56) References Cited

OTHER PUBLICATIONS

3GPP TR 38.913 v15.0.0, "3$^{rd}$ Generation Partnership Project; Technical Specification Group Radio Access Network; Study on Scenarios and Requirements for Next Generation Access Technologies; (Release 15)," Jun. 2018, 39 pages.

3GPP TS 23.501 v16.1.0, "3$^{rd}$ Generation Partnership Project; Technical Specification Group Services and System Aspects; System Architecture for the 5G System; Stage 2 (Release 16)," Jun. 2019, 367 pages.

3GPP TS 38.211 v15.6.0, "3$^{rd}$ Generation Partnership Project; Technical Specification Group Radio Access Network; NR; Physical channels and modulation (Release 15)," Jun. 2019, 97 pages.

3GPP TS 38.212 v16.1.0, "3$^{rd}$ Generation Partnership Project; Technical Specification Group Radio Access Network; NR; Multiplexing and channel coding (Release 16)," Mar. 2020, 27 pages.

3GPP TS 38.214 v16.1.0, "3$^{rd}$ Generation Partnership Project; Technical Specification Group Radio Access Network; NR; Physical layer procedures for date (Release 16)," Mar. 2020, 8 pages.

3GPP Ts 38.300 v15.6.0, "3$^{rd}$ Generation Partnership Project; Technical Specification Group Radio Access Network; NR; NR and NG-RAN Overall Description; Stage 2 (Release 15)," Jun. 2019, 99 pages.

3GPP TS 38.331 v16.0.0, "3$^{rd}$ Generation Partnership Project; Technical Specification Group Radio Access Network; NR; Radio Resource Control (RRC) protocol specification (Release 16)," Mar. 2020, 30 pages.

International Search Report, mailed Sep. 7, 2021, for International Application No. PCT/JP2021/023670, 2 pages.

ITU, "IMT Vision—Framework and overall objectives of the future development of IMT for 2020 and beyond," M Series, Recommendation ITU-R M2083-0, Sep. 2015, 21 pages.

Samsung, "WID proposal for Rel.17 enhancements on MIMO for NR," RP-192436, Agenda Item:. 9.1.1, 3GPP TSG RAN Meeting #86, Sitges, Spain, Dec. 9-12, 2019, 5 pages.

* cited by examiner

| SRS resource set number | Use case | Resource type | SRS resource | ... |
|---|---|---|---|---|
| #0 | Antenna switching | Aperiodic<br>Trigger number =1<br>Slot offset=1 | #0 (port#0, 9th)<br>#1 (port#1, 11th)<br>#2 (port#2, 13th) | ... |
| #1 | Antenna switching | Aperiodic<br>Trigger number=1, 2<br>Slot offset=2 | #3 (port#3, 9th)<br>#4 (port#4, 11th)<br>#5 (port#5, 13th) | ... |
| #2 | Antenna switching | Aperiodic<br>Trigger number=1, 2, 3<br>Slot offset=3 | #6 (port#6, 9th)<br>#7 (port#7, 11th) | ... |
| ⋮ | | | | |

FIG. 10

| Trigger information (2 bits) | Trigger number |
|---|---|
| 0 | No trigger |
| 1 | 1 |
| 2 | 2 |
| 3 | 3 |

FIG. 11

TERMINAL, BASE STATION, AND COMMUNICATION METHOD FOR APERIODIC TRANSMISSION OF REFERENCE SIGNALS

TECHNICAL FIELD

The present disclosure relates to a terminal, a base station, and a communication method.

BACKGROUND ART

In Release 17 of 3rd Generation Partnership Project (3GPP (hereinafter referred to as "Rel. 17"), for the functional extension of Multiple-Input Multiple Output (MIMO) applied to New Radio access technology (NR), improving the coverage performance or capacity performance of a Sounding Reference Signal (SRS) has been discussed (e.g., see Non-Patent Literature (hereinafter referred to as "NPL") 1).

CITATION LIST

Non-Patent Literature

NPL 1
RP-192436, "WID proposal for Rel. 17 enhancements on MIMO for NR," Samsung, December 2019

SUMMARY OF INVENTION

However, there is scope for further study on a method for improving transmission efficiency of a reference signal.

One non-limiting and exemplary embodiment facilitates providing a terminal, a base station, and a communication method each capable of improving transmission efficiency of a reference signal.

A terminal according to an exemplary embodiment of the present disclosure includes: reception circuitry, which, in operation, receives information on an indication of a portion of a plurality of candidate unit time resources for aperiodic transmission of a reference signal; and control circuitry, which, in operation, controls, based on the information, allocation of a time resource used for the aperiodic transmission of the reference signal.

It should be noted that general or specific embodiment may be implemented as a system, a method, an integrated circuit, a computer program, a storage medium, or any selective combination thereof.

According to an exemplary embodiment of the present disclosure, it is possible to improve transmission efficiency of a reference signal.

Additional benefits and advantages of the disclosed embodiment will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 10 illustrates an exemplary SRS resource set;

FIG. 11 illustrates an example of trigger information:

DESCRIPTION OF EMBODIMENTS

Figure 1:
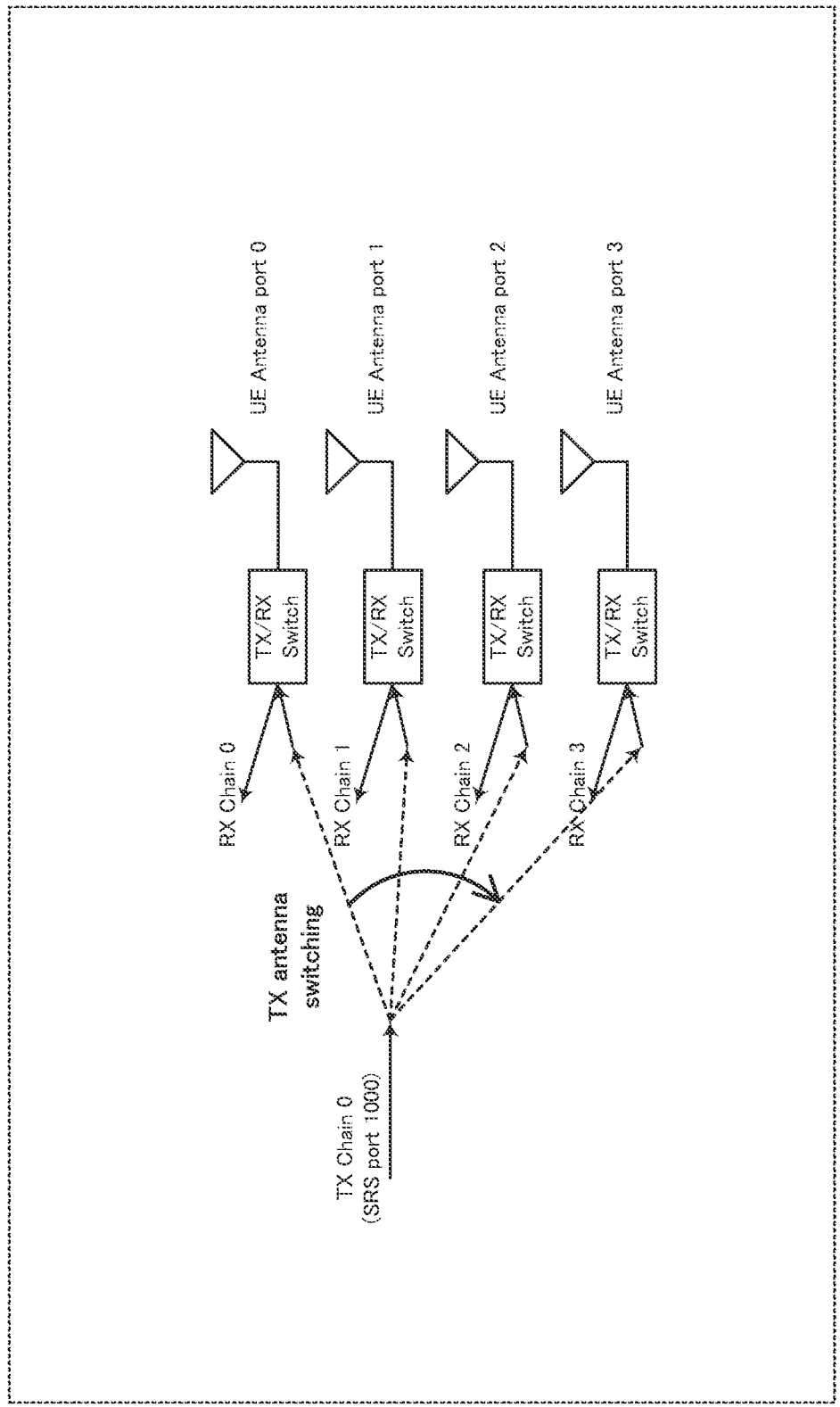
FIG. 1 illustrates an example of Antenna switching of 1T4R.

Hereinafter, an embodiment of the present disclosure will be described in detail with reference to the accompanying drawings.

[SRS]

For an SRS used in NR (e.g., referred to as "NR SRS"), for example, a base station (e.g., sometimes referred to as "eNB" or "gNB") may indicate (or configure) information on a configuration of an SRS (hereinafter referred to as "SRS configuration information") to a terminal (e.g., sometimes referred to as "User Equipment" (UE)). For the SRS configuration information, for example, "SRS resource set" may be defined, which is a parameter group used for each SRS resource, such as a transmission timing of an SRS, a transmission frequency band for an SRS, a sequence number for reference signal generation, and a cyclic shift amount. The SRS configuration information may be configured by, for example, higher layer signaling such as a Radio Resource Control (RRC) layer. The SRS configuration information is also sometimes referred to as, for example, "SRS-Config" which is configured in the RRC layer.

Further, in the NR SRS, a use case of an SRS may be configured for the SRS resource set, such as downlink channel quality estimation for downlink MIMO transmission (e.g., also referred to as "Antenna switching"), uplink channel quality estimation for uplink MIMO transmission (e.g., also referred to as "Code book" or "Non-code book"), or beam control (e.g., also referred to as "beam management"). For example, the terminal may perform SRS transmission according to the use case configured for the SRS resource set.

Further, the NR SRS may support, for example, time domain operations (Time domain SRS behaviors) of three types: a Periodic SRS, a Semi-persistent SRS, and an Aperiodic SRS. For example, any of time domain operations of three types may be configured for the SRS resource set For example, the Periodic SRS and the Semi-persistent SRS are periodically transmitted SRSs. In the Periodic SRS and the Semi-persistent SRS, for example, a transmission slot period and transmission slot offset may be configured for the SRS resource set, and at least one of the RRC layer and Medium Access Control (MAC) layer may indicate ON and OFF of the transmission.

Meanwhile, for example, the Aperiodic SRS is an aperiodically transmitted SRS. In the Aperiodic SRS, for example, the transmission timing may be indicated by trigger information (e.g., "SRS resource indicator (SRI)") included in a downlink control channel (e.g., Physical Downlink Control Channel (PDCCH)) in the physical layer. For example, the terminal may transmit the Aperiodic SRS when Aperiodic SRS transmission is requested by the trigger information. For example, the terminal may transmit the Aperiodic SRS at a timing after the slot offset configured, by the RRC layer, for the SRS resource set from the slot that has received the trigger information. For example, the base station can dynamically (or instantaneously) indicate, to the terminal, the Aperiodic SRS transmission at a predetermined band or timing for channel estimation with a transmission beam.

[Antenna Port]

An NR SRS supports, for example, a function called Antenna switching. In the Antenna switching, for example, a terminal having different numbers of transmission antenna ports and reception antenna ports which are simultaneously processible (e.g., number of transmission antenna ports is smaller) may perform downlink channel quality estimation for downlink MIMO transmission.

FIG. 1 illustrates an example of the Antenna switching in, as an example, a terminal in which the number of simultaneously processible transmission antenna ports is one (e.g., sometimes expressed as one-transmission (1 Tx)) and the number of simultaneously processible reception antenna ports is four (e.g., sometimes expressed as four-reception (4 Rx)) (e.g., also referred to as terminal of "1T4R").

As in FIG. 1, the terminal with the number of transmission antenna ports less than the number of reception antenna ports temporally switches an antenna port for SRS transmission (e.g., TX antenna), for example. This allows a base station to estimate quality of all spatial channels in, for example, an environment where reversibility of channel characteristics can be assumed between downlink (DL) and uplink (UL), such as Time Division Duplexing (TDD). The base station can improve DL MIMO performance by, for example, calculating a transmission weight in the DL MIMO transmission by using an SRS.

For example, in NR licensed band specifications, a symbol to which an SRS is placed (hereinafter also referred to as "SRS symbol") can be placed in six symbols at the end of a slot.

Figure 2:
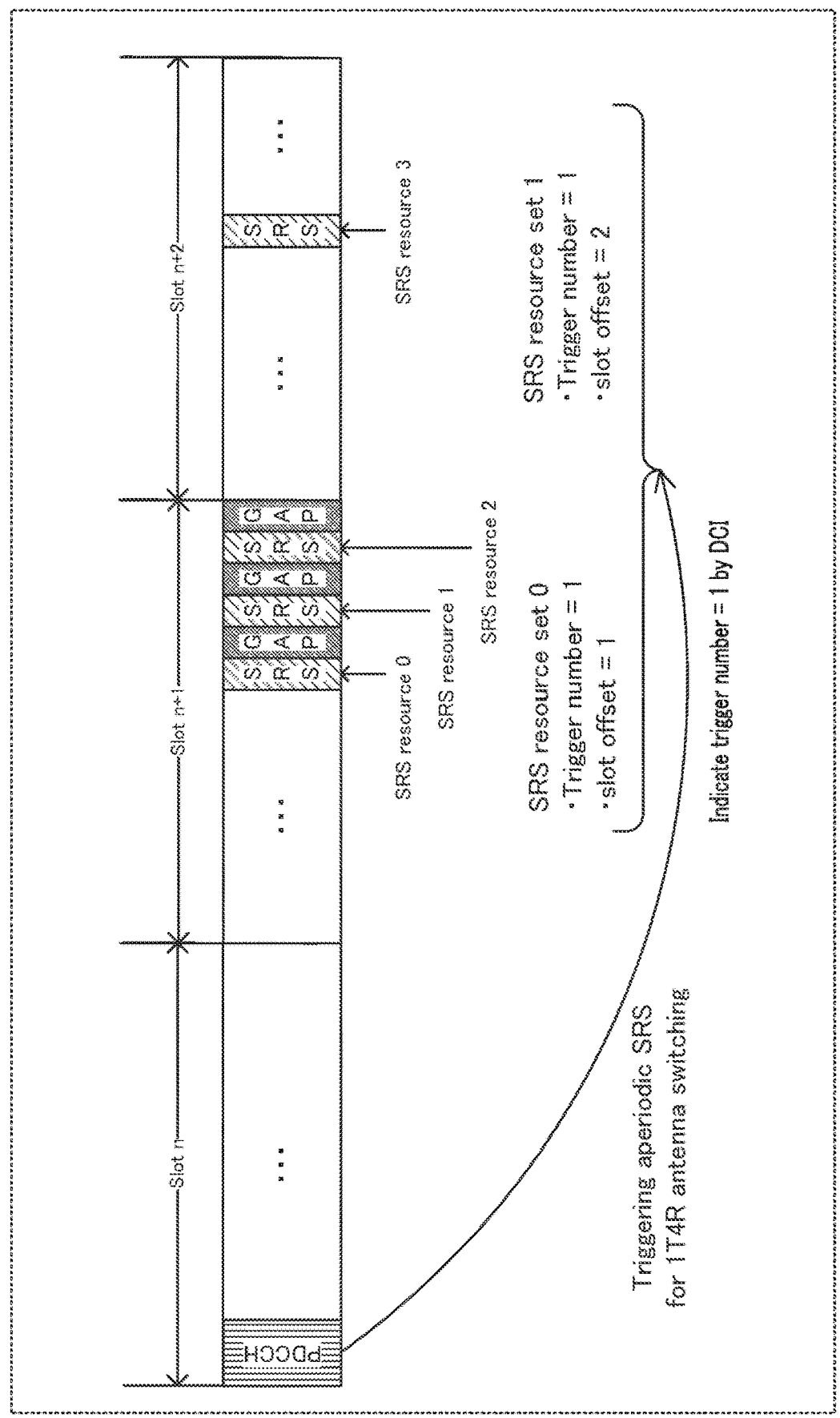
FIG. 2 illustrates an example of triggering Aperiodic SRS transmission on a terminal of 1T4R.

In this case, for example, the Antenna switching of 1T4R can be configured using two slots (e.g., two SRS resource sets). In one example, FIG. 2 illustrates an example of SRS (e.g., Aperiodic SRS) transmission in the Antenna switching of 1T4R. As illustrated in FIG. 2, for example, in SRS resource set number 0 (e.g., SRS resource set 0) and SRS resource set number 1 (e.g., SRS resource set 1) which are configured by an RRC layer, transmission slot timing of a slot offset=1 and transmission slot timing of a slot offset=2 may be configured, respectively. Moreover, the same trigger number (e.g., trigger number=1) may be configured for each of SRS resource set number 0 and SRS resource set number 1. Further, for example, an SRS resource of three symbols (e.g., SRS resource numbers 0, 1, and 2) may be configured for SRS resource set number 0, and an SRS resource of one symbol (e.g., SRS resource number 3) may be configured for SRS resource set number 1. Incidentally, in FIG. 2, a "GAP" between SRS symbols may be, for example, a time that is configured for a terminal to physically switch a transmission antenna port.

As illustrated in FIG. 2, a base station may indicate by trigger information (in FIG. 2, trigger number=1), to a terminal of 1T4R, the Aperiodic SRS transmission using two slots (or two SRS resource sets) for the Antenna switching use case. The terminal may, for example, switch a transmission antenna port by the Antenna switching in the two slots and transmit an Aperiodic SRS, based on the trigger information.

In Rel. 17, for example, for the purpose of the functional extension of MIMO in NR, it has been discussed to increase the upper limit of the number of transmission antenna ports of an SRS from four to eight and to support a terminal of 1T8R (e.g., see NPL 1).

However, a method for triggering the Aperiodic SRS transmission for the Antenna switching use case on the terminal of 1T8R has not been fully discussed.

Figure 3:
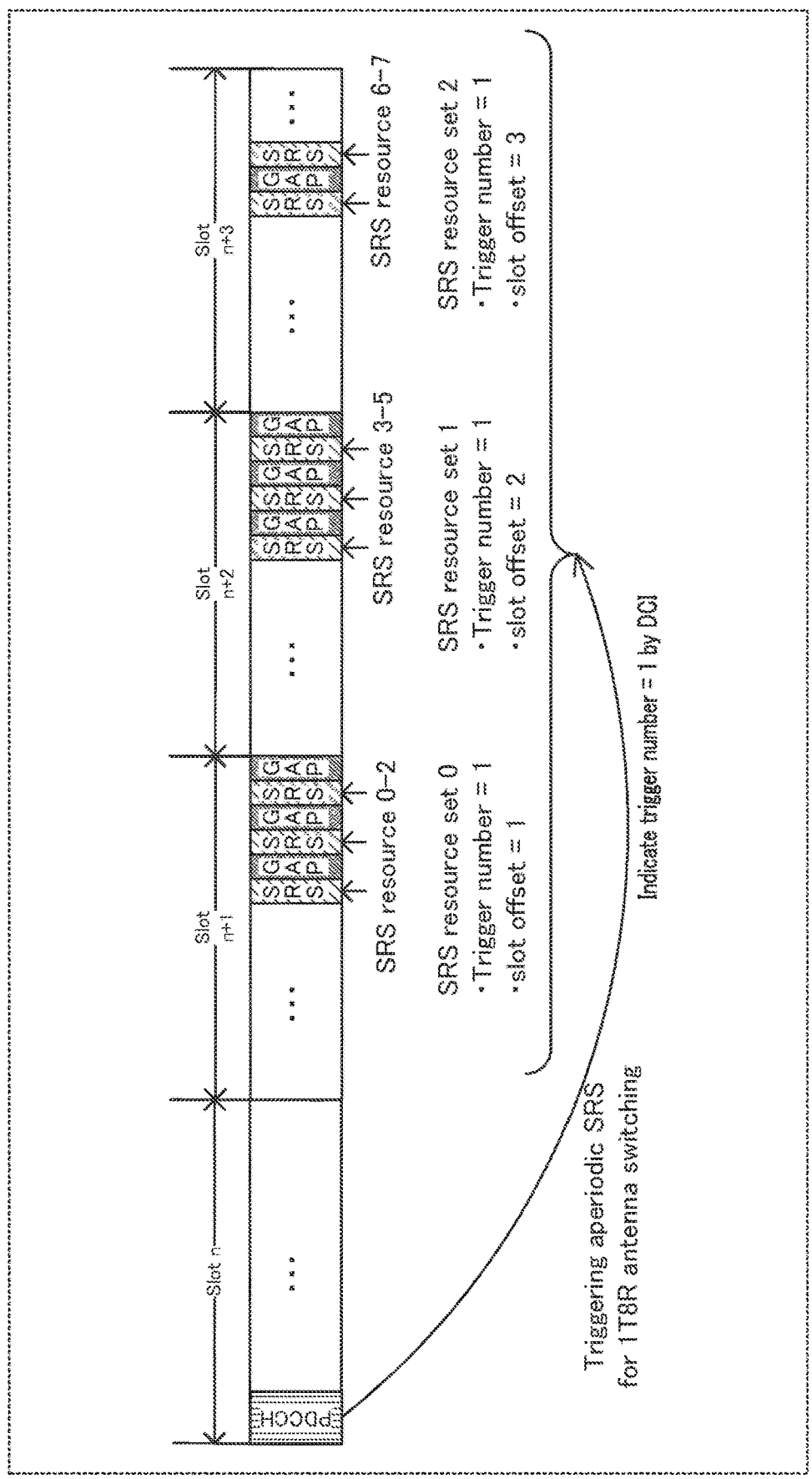
FIG. 3 illustrates an example of triggering Aperiodic SRS transmission on a terminal of 1T8R.

FIG. 3 illustrates an example in which a base station triggers, on a terminal of 1T8R, the Aperiodic SRS transmission for the Antenna switching use case. FIG. 3 illustrates an example of extending a method for triggering on a terminal of 1T4R (e.g., FIG. 2). As illustrated in FIG. 3, the base station may trigger, on the terminal of 1T8R, SRS transmission using different three slots (or different three SRS resource sets).

Here, in NR, a slot format may be dynamically updated by a base station with downlink control information (e.g., DCI) (e.g., DCI format 2-0). On the other hand, a slot offset of an SRS resource set configured by an RRC layer is not changed dynamically. For this reason, at a terminal, a change in the slot format may cause a case where an uplink signal including an SRS is not transmitted in the slot, which is an SRS transmission timing. In this case, the terminal does not transmit an SRS in the slot where the uplink signal cannot be transmitted (e.g., downlink slot), and thus, the base station may re-trigger, on the terminal, the Aperiodic SRS transmission using three slots, for example.

Figure 4:
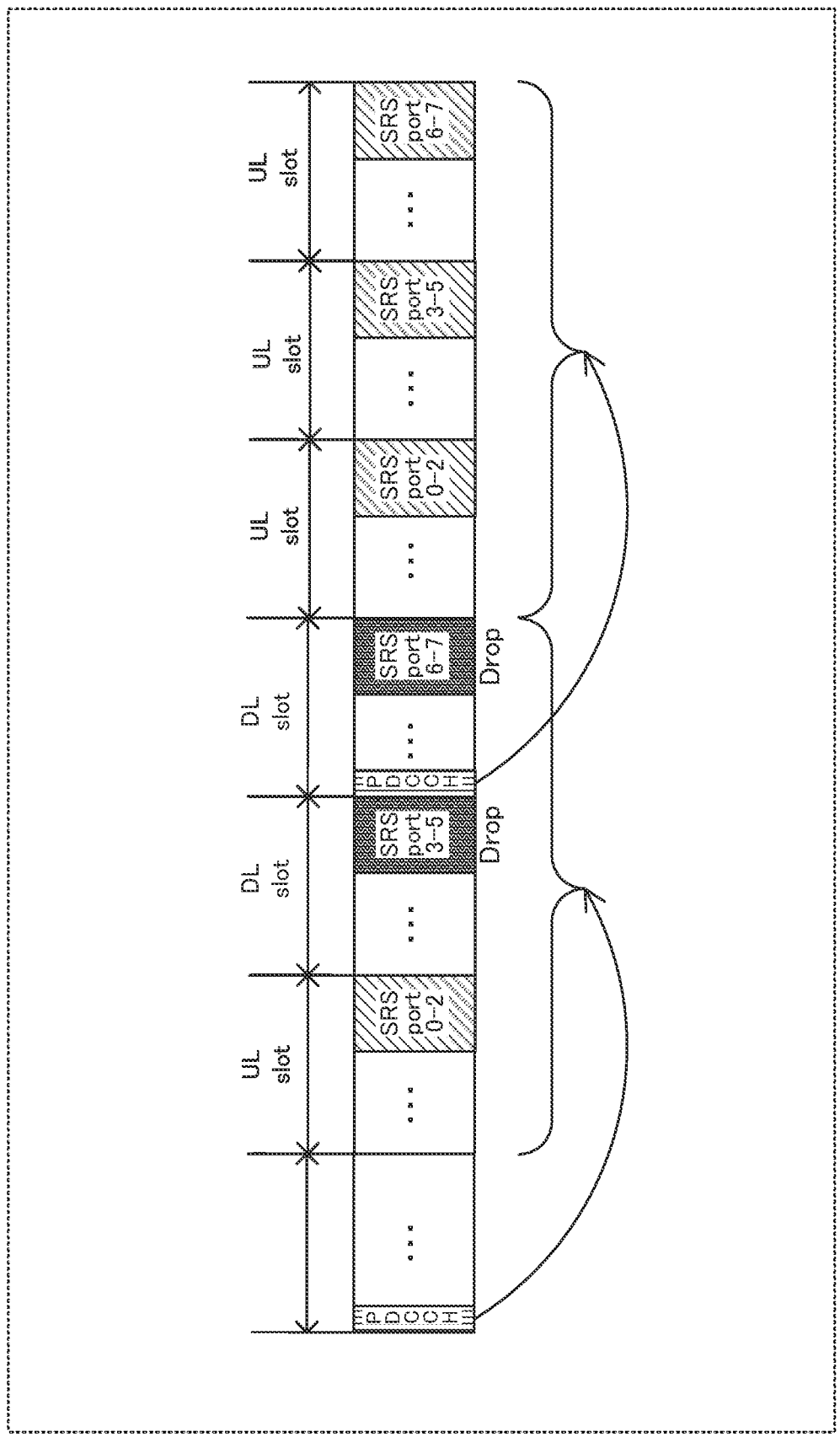
FIG. 4 illustrates an example of re-triggering Aperiodic SRS transmission on the terminal of 1T8R.

FIG. 4 illustrates an example of transmitting an SRS when the slot format is changed at the SRS transmission timing in the terminal. Incidentally, SRS port 0-2 illustrated in FIG. 4 indicates that SRS symbols configured by SRS resource numbers 0 to 2 are transmitted using antenna ports 0 to 2.

In the example illustrated in FIG. 4, among the three slots indicated by PDCCH (e.g., DCI) to transmit SRSs, the second slot and the third slot are changed from uplink slots to downlink slots. In this case, the terminal transmits the SRS of the first slot while not transmitting (i.e., dropping) the SRSs of the second slot and the third slot. In this case, as illustrated in FIG. 4, the base station may re-trigger the SRS transmission in all three slots, including the SRS of the first slot that the terminal has already transmitted, for example.

Thus, with respect to triggering the Aperiodic SRS transmission using a plurality of slots, a method has not been discussed for triggering the SRS transmission in some slots (or SRS resource sets or antenna ports for SRS transmission). Hence, as mentioned above, when the SRS transmission is not performed in a portion of slots among the plurality of slots used for the SRS transmission, the SRS transmission using the plurality of slots including the slot in which the SRS transmission has been performed (i.e., slot that does not need to be re-triggered) is re-triggered, thereby reducing the transmission efficiency of an SRS. For example, an increase in an overhead due to SRS transmission may deteriorate system performance in uplink.

In an exemplary embodiment of the present disclosure, therefore, a description will be given of a method for improving the transmission efficiency of an SRS by enabling flexibly scheduling of an Aperiodic SRS to a terminal.

Note that, a case of triggering the SRS transmission in some of slots (or antenna ports) is not limited to, for example, the case relating to triggering the SRS transmission by dynamically changing the slot format as mentioned above. For example, a case may be assumed where, when a terminal preferentially performs data transmission from some antenna ports over the SRS transmission, the terminal may trigger the SRS transmission in some slots (or antenna ports) in order to preferentially improve channel estimation accuracy with the SRS transmitted from some antenna ports.

[Overview of Communication System]

A communication system according to an aspect of the present disclosure may include, for example, base station 100 (e.g., gNB or eNB) and terminal 200 (e.g., UE).

For example, base station 100 may be a base station for NR and terminal 200 may be a terminal for NR Base station 100 may trigger, on terminal 200, at least a portion of transmission of the Aperiodic SRS transmission using a plurality of slots and receive the corresponding Aperiodic SRS, for example. Terminal 200 may transmit, based on the trigger information from base station 100, at least a portion of Aperiodic SRSs, using the plurality of slots, for example.

Figure 5:
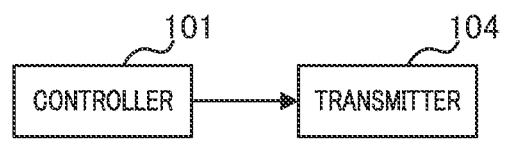
FIG. 5 is a block diagram illustrating an exemplary configuration of a part of a base station.

FIG. 5 is a block diagram illustrating an exemplary configuration of a part of base station 100 according to an aspect of the present disclosure. In base station 100 illustrated in FIG. 5, transmitter 104 transmits information (e.g., trigger information) indicating a portion of a plurality of candidate unit time resources (e.g., slots) for transmitting an aperiodic reference signal (e.g., Aperiodic SRS) by terminal 200. Controller 101, for example, controls allocation of the time resources used for receiving the reference signal, based on the information.

Figure 6:
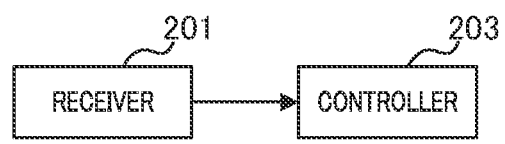
FIG. 6 is a block diagram illustrating an exemplary configuration of a part of a terminal.

FIG. 6 is a block diagram illustrating an exemplary configuration of a part of terminal 200 according to an aspect of the present disclosure. In terminal 200 illustrated in FIG. 6, receiver 201 receives information (e.g., trigger information) indicating a portion of a plurality of candidate unit time resources (e.g., slots) for transmitting an aperiodic reference signal (e.g., Aperiodic SRS). Controller 203 controls allocation of the time resources used for transmitting the reference signal, based on the information.

[Configuration of Base Station]

Figure 7:
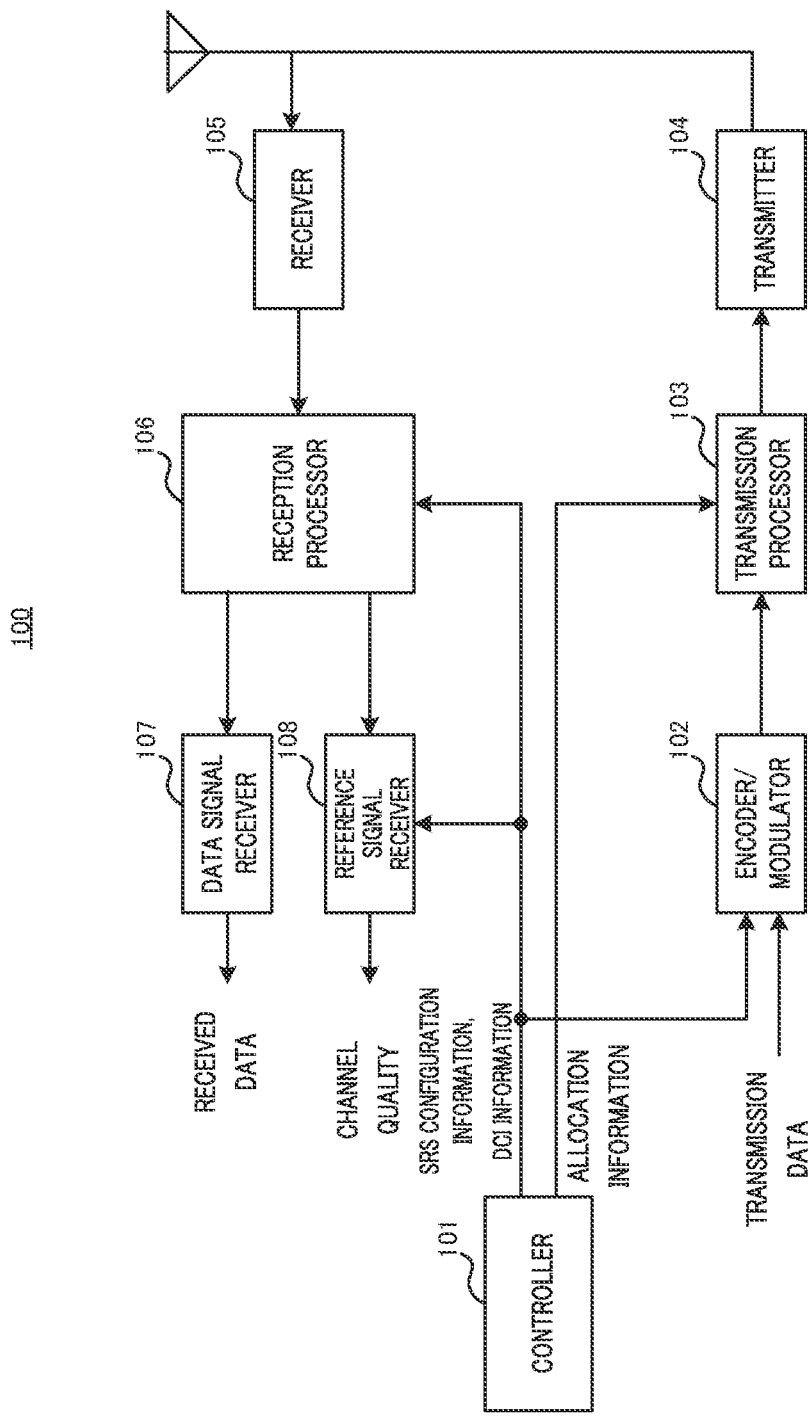
FIG. 7 is a block diagram illustrating an exemplary configuration of the base station.

FIG. 7 is a block diagram illustrating an exemplary configuration of base station 100 according to an aspect of the present disclosure. In FIG. 7, base station 100 may include, for example, controller 101, encoder/modulator 102, transmission processor 103, transmitter 104, receiver 105, reception processor 106, data signal receiver 107, and reference signal receiver 108.

Controller 101 may control SRS scheduling, for example. In one example, for terminal 200 on which the Aperiodic SRS transmission is triggered, controller 101 may generate the SRS configuration information, or downlink control information (e.g., DCI) that is used for requesting the Aperiodic SRS transmission.

Moreover, the SRS resource set of the SRS configuration information may include, for example, a parameter such as a transmission frequency band for each SRS resource (e.g., including number of transmission Combs), a transmission symbol position, the number of SRS ports or a SRS port number, a sequence number for reference signal generation, a cyclic shift amount (e.g., Cyclic Shift value), frequency hopping, or sequence hopping.

For example, a plurality of SRS resource sets can be configured in the SRS configuration information. Further, for example, one or a plurality of pieces of trigger number indicatable by the trigger information can be configured for each SRS resource set for an Aperiodic SRS. Terminal 200 may apply, for example, the SRS resource set associated with the trigger number indicated by the trigger information.

The DCI may include a few bits of the trigger information for the Aperiodic SRS (e.g., SRI field), for example. For example, a trigger number of the Aperiodic SRS (e.g., SRS resource set for Aperiodic SRS) of the number corresponding to the number of bits of the trigger information (e.g., number of values representable by bits of trigger information) may be associated with each value representable by bits of the trigger information. In one example, in a case where the trigger information has two bits (e.g., representable value: four values), "no request (or No Trigger) for SRS transmission" and the trigger numbers for three Aperiodic SRSs may be associated with the trigger information. When the trigger information has two bits, base station 100 may select and trigger, on terminal 200, Aperiodic SRS transmission each associated with three different trigger numbers, for example.

Incidentally, a plurality of SRS resource sets may be associated with one trigger number. This association allows, for example, the Aperiodic SRS transmission using a plurality of slots to be triggered with one trigger information. By way of example, base station 100 may indicate, to a terminal of 1T4R or a terminal of 1T8R, the Aperiodic SRS transmission for the Antenna switching use case, based on the association between the trigger information and the SRS resource set.

Further, for example, a plurality of trigger numbers may be associated with an SRS resource set configured for each slot. For example, the number of trigger numbers associated with the SRS resource set may vary between different SRS resource sets. This association allows base station 100 to, for example, trigger the SRS transmission to the SRS resource set configured for a portion of the plurality of slots.

Controller 101 may, for example, output the control information including the SRS configuration information generated as described above to encoder/modulator 102. The SRS configuration information may be transmitted, for example, as control information for RRC layer (i.e., higher layer signaling or RRC signaling), to terminal 200 which is a target after transmission processing has been performed in encoder/modulator 102, transmission processor 103, and transmitter 104.

Controller 101 may, for example, output the DCI including the trigger information for the Aperiodic SRS transmission generated as described above to encoder/modulator 102. The DCI may be transmitted, for example, as control information for layer 1 or layer 2, to terminal 200 which is a target after transmission processing has been performed in encoder/modulator 102, transmission processor 103, and transmitter 104.

As described above, while the SRS configuration information is indicated from base station 100 to terminal 200 by, for example, higher layer signaling, the DCI including the trigger information may be indicated from base station 100 to terminal 200 by a PDCCH. For example, since the DCI has a shorter indication interval (or transmission interval) as compared to the SRS configuration information, base station 100 can dynamically (or instantaneously) indicate the trigger information according to the communication status of each terminal 200.

Further, controller 101 may, for example, control reception of the Aperiodic SRS based on the SRS configuration information and the trigger information. For example, controller 101 may output the SRS configuration information and the trigger information to reception processor 106 and reference signal receiver 108.

Incidentally, the DCI may include, in addition to the trigger information for the Aperiodic SRS, other information such as allocation information on a frequency resource for uplink data or downlink data (e.g., Resource Block (RB)) and information on encoding and modulation scheme for data (e.g., Modulation and Coding Scheme (MCS)), for example. Controller 101 may output, to transmission processor 103, the allocation information on a radio resource for the downlink data transmission, for example.

Furthermore, in a case where base station 100 changes a slot format, for example, controller 101 may generate information on the slot format. Controller 101 may, for example, output DCI including the information on the slot format to encoder/modulator 102.

Encoder/modulator 102 may, for example, encode and modulate the SRS configuration information or the DCI input from controller 101 and output the resulting modulation signal to transmission processor 103. Encoder/modulator 102 may also, for example, encode and modulate the data signal (or transmission data) to be input and output the resulting modulation signal to transmission processor 103.

Transmission processor 103 may, for example, form a transmission signal by mapping the modulation signal input from encoder/modulator 102 to a frequency band in accordance with the allocation information on the radio resource for the downlink data transmission input from controller 101. For example, in a case where the transmission signal is an orthogonal frequency division multiplexing (OFDM) signal, transmission processor 103 may map the modulation signal to a frequency resource, convert the mapped signal into a time waveform through inverse fast Fourier transform (IFFT) processing, add a Cyclic Prefix (CP), and thereby form the OFDM signal.

Transmitter 104 may, for example, on the transmission signal input from transmission processor 103, perform transmission radio processing such as up-conversion and digital-analog (D/A) conversion, and transmit the transmission signal resulting from the transmission radio processing via an antenna.

Receiver 105 may, for example, on a radio signal received via the antenna, perform reception radio processing such as down-conversion and analog-to-digital (A/D) conversion, and output the received signal resulting from the reception radio processing to reception processor 106.

Reception processor 106 may, for example, identify a resource to which the uplink data signal is mapped, based on the information input from controller 101, and extract a signal component mapped to the identified resource from the received signal.

Reception processor 106 may also identify the resource to which the Aperiodic SRS is mapped, based on the SRS configuration information and the DCI (e.g., trigger information) input from controller 101, and extract a signal component mapped to the identified resource from the received signal. By way of example, reception processor 106 may receive the Aperiodic SRS at a slot timing obtained by adding a slot offset configured for SRS resource set(s) associated with the trigger number of the Aperiodic SRS indicated by the trigger information to the slot that has transmitted the DCI.

Incidentally, reception processor 106 may, for example, based on the slot format, identify the resource to which the Aperiodic SRS is mapped. For example, reception processor 106 may not perform the reception processing of an SRS even at a slot timing at which the Aperiodic SRS can be mapped, in case where the timing is not an uplink slot (e.g., in the case of downlink slot).

Reception processor 106, for example, outputs the extracted uplink data signal to data signal receiver 107 and outputs an Aperiodic SRS signal to reference signal receiver 108.

Data signal receiver 107 may, for example, decode a signal input from reception processor 106 and output uplink data (or received data).

Reference signal receiver 108 may, for example, measure received quality of each frequency resource, based on the Aperiodic SRS signal input from reception processor 106 and the parameter information of the SRS resource set input from controller 101, and output information on the received quality. Here, signal receiver 108 may, for example, perform channel quality measurement using a desired Aperiodic SRS by identifying the antenna port applied to the Aperiodic SRS transmitted from terminal 200 which is a target and the symbol position in the slot, based on the SRS configuration information and the DCI (e.g., trigger information) which are input from controller 101.

[Configuration of Terminal]

Figure 8:
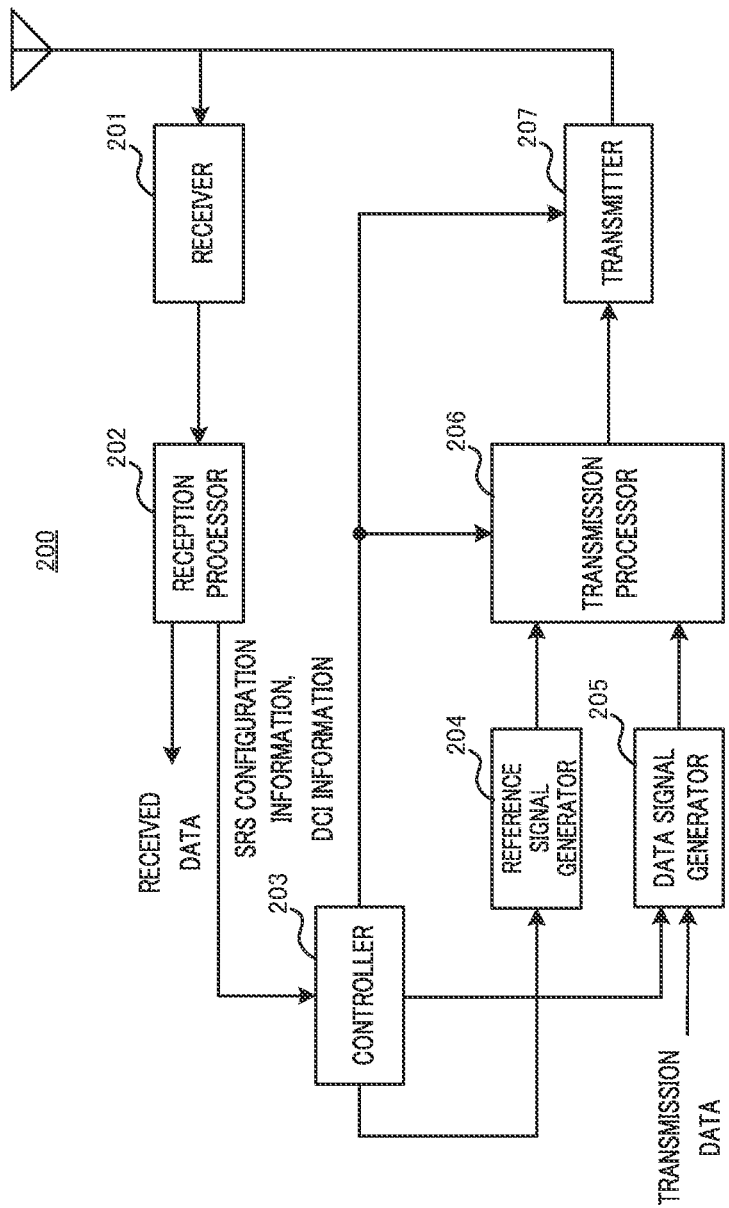
FIG. 8 is a block diagram illustrating an exemplary configuration of the terminal.

FIG. 8 is a block diagram illustrating an exemplary configuration of terminal 200 according to an aspect of the present disclosure. In FIG. 8, terminal 200 may include, for example, receiver 201, reception processor 202, controller 203, reference signal generator 204, data signal generator 205, transmission processor 206, and transmitter 207.

Receiver 201 may, for example, on a radio signal received via the antenna, perform reception radio processing such as down-conversion and analog-to-digital (A/D) conversion, and output the received signal resulting from the reception radio processing to reception processor 202.

Reception processor 202 may, for example, extract the SRS configuration information and the DCI included in a received signal input from receiver 201, and output the extracted information to controller 203. Reception processor 202 may also, for example, decode a downlink data signal included in the received signal and output the decoded downlink data signal (or received data). Incidentally, in a case where the received signal is an OFDM signal, reception processor 202 may, for example, perform CP removal processing, and Fourier transform (Fast Fourier Transform: FFT) processing.

Controller 203 may, for example, control transmission of the Aperiodic SRS, based on the SRS configuration information and the DCI (e.g., trigger information) input from reception processor 202. For example, when controller 203 detects, from the trigger information, an indication from base station 100 regarding the Aperiodic SRS transmission, controller 203 identifies the SRS resource set to be used for transmitting the Aperiodic SRS, based on the SRS configuration information and the trigger information. Controller 203 may then, for example, extract SRS resource information (e.g., frequency resource information, reference signal information, and the like) to be applied to the Aperiodic SRS, based on the identified SRS resource set, and output (or indicate to or configure for) the extracted information to reference signal generator 204.

In one example, in a case where terminal 200 is a terminal of 1T8R and is triggered the Aperiodic SRS transmission for the Antenna switching use case, terminal 200 may perform the SRS transmission by switching a transmission antenna port symbol-by-symbol, from eight antenna ports. In a case where the number of SRS resources included in one SRS resource set is up to three (i.e., when SRS that can be transmitted in one slot is of three symbols), for example, terminal 200 may transmit an Aperiodic SRS using the up to three SRS resource sets (i.e., three slots). In this condition, for example, each of the three SRS resource sets (e.g., SRS transmission using one to three slots) may be associated with one or more trigger numbers. Terminal 200 may, for example, identify an SRS resource set associated with the trigger number and transmit an SRS corresponding to the identified SRS resource set. For example, when the number of trigger numbers associated with the above-mentioned three SRS resource sets is different from each other, the number of slots used for the SRS transmission indicated to terminal 200 can be configured variably, according to the trigger number indicated from base station 100. Note that, the maximum number of SRS resources included in one SRS resource set is not limited to three.

Further, controller 203 may, for example, identify the frequency resource information and the MCS to which an uplink data signal is mapped, based on the DCI input from reception processor 202, and output the frequency resource information to transmission processor 206 and output the MCS information to data signal generator 205.

Further, controller 203 may, for example, identify an SRS resource set used for the Aperiodic SRS and output information indicating an antenna port number for performing the SRS transmission by the SRS resource set, to transmitter 207. Further, controller 203 may, for example, extracts an antenna port number for transmitting data, from the DCI, and output information indicating the antenna port number to transmitter 207.

Upon receiving an indication for generating a reference signal from controller 203, reference signal generator 204 may, for example, generate the reference signal (e.g., Aperiodic SRS) based on the SRS resource information input from controller 203 and then output to transmission processor 206.

Data signal generator 205 may, for example, generate a data signal by encoding and modulating transmission data (or uplink data signal) to be input, based on the MCS information input from controller 203. Data signal generator 205 may, for example, output the generated data signal to transmission processor 206.

Transmission processor 206 may, for example, map the Aperiodic SRS that is input from reference signal generator 204 to the frequency resource indicated from controller 203. Transmission processor 206 may also, for example, map the data signal that is input from data signal generator 205 to the frequency resource indicated from controller 203. Thus, a transmission signal is formed. In a case where the transmission signal is an OFDM signal, transmission processor 206 may, for example, perform the IFFT processing on the signal after the mapping to the frequency resource and then add the CP.

Transmitter 207 may, for example, on the transmission signal formed in transmission processor 206, perform transmission radio processing such as up-conversion and digital-analog (D/A) conversion, and transmit the signal resulting from the transmission radio processing via an antenna. Incidentally, when transmitting an SRS, for example, transmitter 207 may switch an antenna port for transmitting the SRS, based on the information on the antenna port number for each SRS symbol input from controller 203. Further, when transmitting a data signal, for example, transmitter 207 may switch an antenna port for transmitting the data signal, based on the information on the antenna port number input from controller 203.

[Operations of Base Station 100 and Terminal 200]

A description will be given of exemplary operations of base station 100 and terminal 200 having the above-mentioned configurations.

Figure 9:
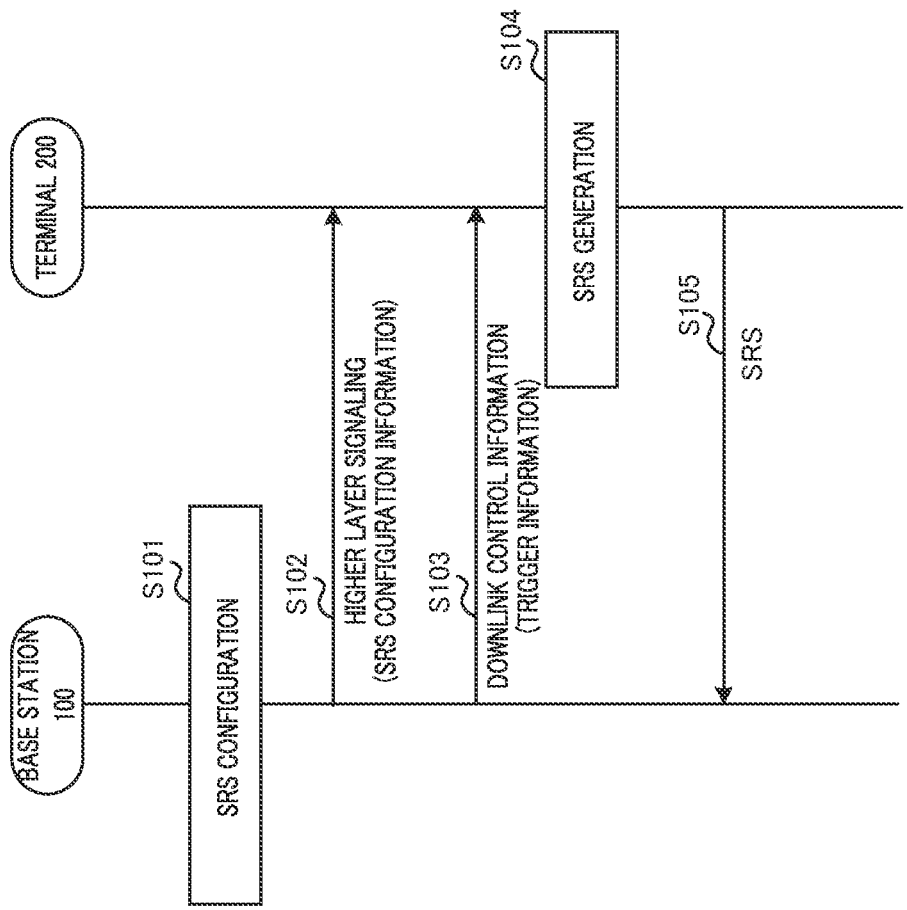
FIG. 9 is a sequence diagram illustrating exemplary operations of the terminal and the base station.

FIG. 9 is a sequence diagram illustrating exemplary operations of base station 100 and terminal 200.

Base station 100, for example, makes a configuration on an indication for transmitting an Aperiodic SRS to terminal 200 (S101). In one example, base station 100 may generate SRS configuration information including an SRS resource set (or slot) to be used for the Aperiodic SRS transmission.

Base station 100, for example, transmits (or configures or indicates) the SRS configuration information to terminal 200 by higher layer signaling (e.g., RRC layer signal) (S102).

Further, for example, when requesting the SRS transmission, base station 100 transmits, to terminal 200, downlink control information (e.g., DCI) including the trigger information indicating any of the SRS configuration information (e.g., SRS resource set) configured for terminal 200 (S103).

Terminal 200, for example, generates an Aperiodic SRS, based on the SRS configuration information transmitted from base station 100 and the trigger information (S104). Terminal 200 transmits the generated Aperiodic SRS to base station 100 (S105). For example, terminal 200 may determine an antenna port (or slot) from which the Aperiodic SRS is transmitted, based on the SRS configuration information and the trigger information. Base station 100, for example, receives the Aperiodic SRS from terminal 200, based on the SRS configuration information and the trigger information that have been transmitted to terminal 200.

[Generation Method of Trigger Information for Aperiodic SRS]

An exemplary method for generating trigger information for an Aperiodic SRS in base station 100 (e.g., controller 101) will be described.

For example, in Aperiodic SRS transmission using a plurality of slots, such as for an Antenna switching use case, base station 100 may generate trigger information that can indicate SRS transmission in a portion of slots. In other words, base station 100 may generate information indicating a portion of the plurality of slots for the Aperiodic SRS transmission to be performed by terminal 200.

FIG. 10 illustrates an exemplary SRS resource set (e.g., SRS resource information for each slot configured for terminal 200). Further, FIG. 11 illustrates an example of trigger information. The SRS resource set may be configured for terminal 200 by, for example, an RRC layer. The trigger information may be indicated to terminal 200 by, for example, DCI.

As illustrated in FIG. 10, in the SRS resource, at least one of "Use case," "Resource type," and "SRS resource" may be configured.

For the "use case," a use case of an SRS such as Antenna switching, Beam management may be configured, for example. Terminal 200 may perform an operation according to the use case configured in the SRS resource set. In one example, in a case where the use case is the Antenna switching, terminal 200 may switch an antenna port for transmission for each SRS resource.

For the "Resource type," any type of Time domain SRS behavior of Aperiodic transmission, Semi-Persistent transmission, or Periodic transmission may be configured, for example. In one example, when the Resource type is the Aperiodic transmission, a trigger number and a slot offset may be configured for terminal 200, as illustrated in FIG. 10.

As illustrated in FIG. 10, each of SRS resource sets may be associated with one or more trigger numbers (e.g., also referred to as "aperiodicSRS-ResourceTrigger"). In FIG. 10, an SRS resource set corresponding to each of a plurality of slots (e.g., any of slot offsets=1 to 3) used for the Aperiodic SRS transmission may be associated with any of a plurality of values (trigger numbers=0 to 3 in FIG. 11) represented by bits of trigger information (two bits in FIG. 11).

Further, for example, the associated number of values of the trigger information (e.g., trigger numbers) varies between different SRS resource sets (i.e., different slots). In the example illustrated in FIG. 10, trigger number=1 (i.e., one value) is associated with SRS resource set #0, trigger numbers=1 and 2 (i.e., two values) are associated with SRS resource set #1, and trigger numbers=1, 2, and 3 (i.e., three values) are associated with SRS resource set #2.

That is, in the example illustrated in FIG. 10, trigger number=1 (e.g., same value) among the plurality of values represented by the bits of the trigger information is associated with information (e.g., SRS resource set) related to each of the three slots (slot offsets=1 to 3), for example. Similarly, in the example illustrated in FIG. 10, trigger number=2 (e.g., same value) among the plurality of values represented by the bits of the trigger information is associated with the SRS resource set related to each of the two slots (slot offsets=2 and 3), for example.

The "SRS resource" may include, for example, SRS resource information in a slot. The SRS resource information may include, for example, a parameter such as the number of transmission antenna ports (or port numbers), a transmission symbol position, or sequence information. By way of example, in FIG. 10, in respective SRS resources #0 to #7 configured in each SRS resource set, a combination of a transmission antenna port number (e.g., any of #0 to #7) and a transmission symbol position (e.g., any of 9th symbol, 11th symbol, and 13th symbol in slot) may be configured.

Further, as illustrated in FIG. 11, a value that can be taken by the trigger information included in the DCI according to the number of bits may be associated with the trigger number. In the example illustrated in FIG. 11, since the trigger information is two bits (e.g., four values of 0 to 3), the "No Aperiodic SRS transmission (No trigger)" is associated with one value (e.g., trigger information=0), and a different trigger number may be associated with each of the three values (e.g., trigger information=1 to 3).

For example, when the SRS resource sets illustrated in FIG. 10 are configured for terminal 200, base station 100 can trigger, on terminal 200, the Aperiodic SRS transmission using three slots, two slots, and one slot by indicating trigger information=1, 2, and 3 illustrated in FIG. 11, respectively.

Figure 12:
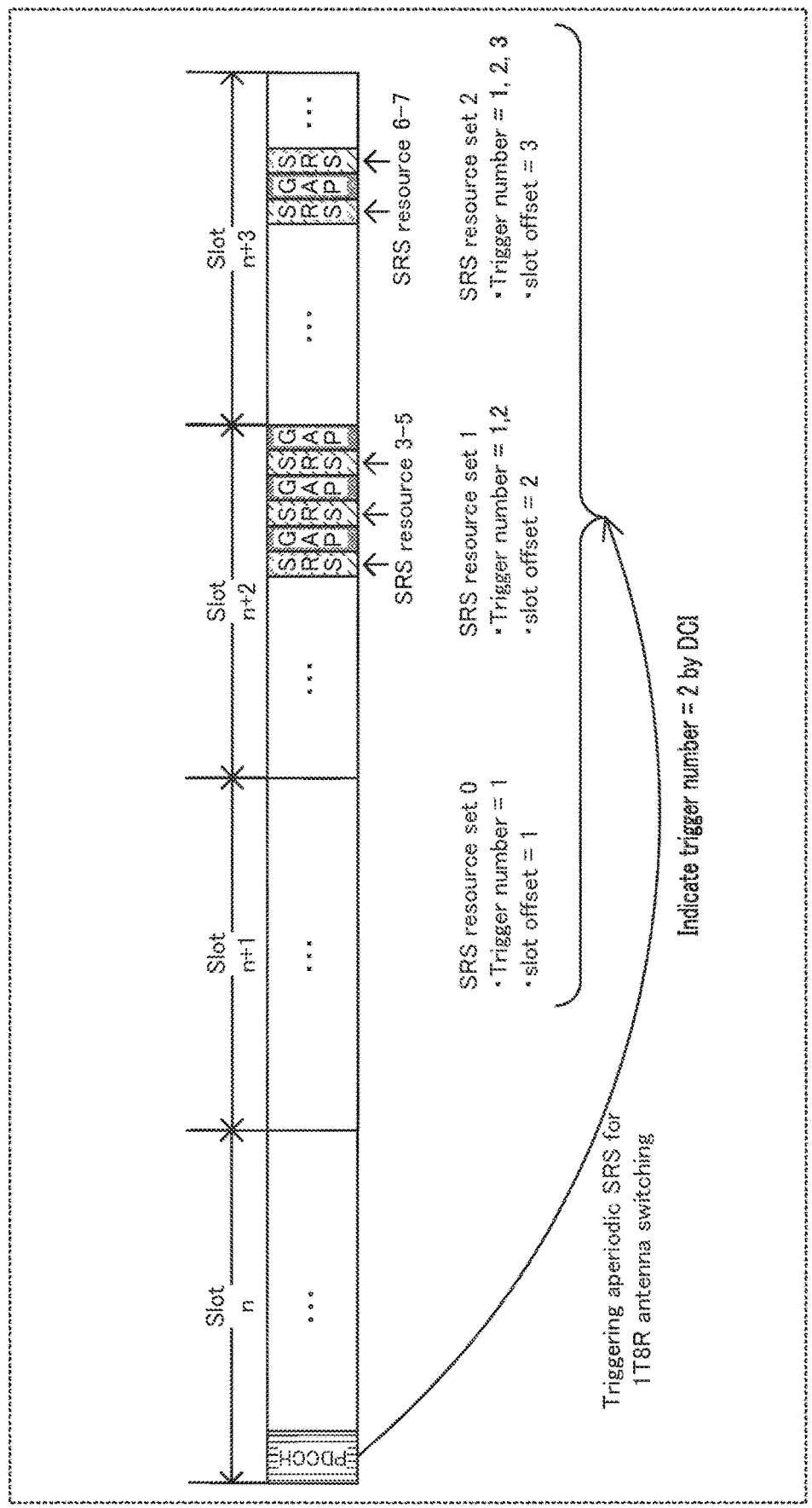
FIG. 12 illustrates another example of triggering Aperiodic SRS transmission on a terminal of 1T8R.

FIG. 12 illustrates an example of triggering the Aperiodic SRS transmission on terminal 200 of 1T8R.

In the example illustrated in FIG. 12, base station 100 indicates trigger information=2 by the DCI to terminal 200. For example, in FIG. 11, trigger information=2 is associated with trigger number=2. Further, for example, in FIG. 10, trigger number=2 is associated with SRS resource set numbers=1 and 2. Thus, in FIG. 12, base station 100 may indicate, to terminal 200, the Aperiodic SRS transmission using the SRS resource (e.g., antenna port numbers=3 to 5, transmission symbol positions=9th, 11th, and 13th symbols) of the second slot (or slot offset=2) corresponding to SRS resource set number=1, and the SRS resource (e.g., antenna port numbers 6 and 7 and transmission symbol positions=9th and 11th symbols) of the third slot (or slot offset=3) corresponding to SRS resource set number=2.

Accordingly, in FIG. 12, for example, terminal 200 transmits, based on trigger number 2 indicated by the trigger information, an Aperiodic SRS using SRS resources of the second slot and third slot from the slot in which the trigger information (or PDCCH) has been received. In other words, in FIG. 12, terminal 200 need not perform the Aperiodic SRS transmission using the SRS resource of the first slot (e.g., slot offset=1) from the slot in which the trigger information has been received.

Thus, with respect to triggering the Aperiodic SRS transmission using the three slots illustrated in FIG. 12 (e.g., slot offsets=1 to 3), base station 100 may trigger the SRS transmission in some of slots (e.g., slot offsets=2 and 3), for example. In other words, base station 100 need not trigger the SRS transmission in the slot corresponding to slot offset=1 among the three slots illustrated in FIG. 12.

For example, base station 100 may transmit, to terminal 200, a trigger number (in FIG. 2, trigger number=2) that is associated with an SRS resource set corresponding to some of the slots (e.g., slot offsets=2 and 3) and that is not associated with an SRS resource set corresponding to the other slot (e.g., slot offset=1), among SRS resource sets illustrated in FIG. 10.

Figure 13:
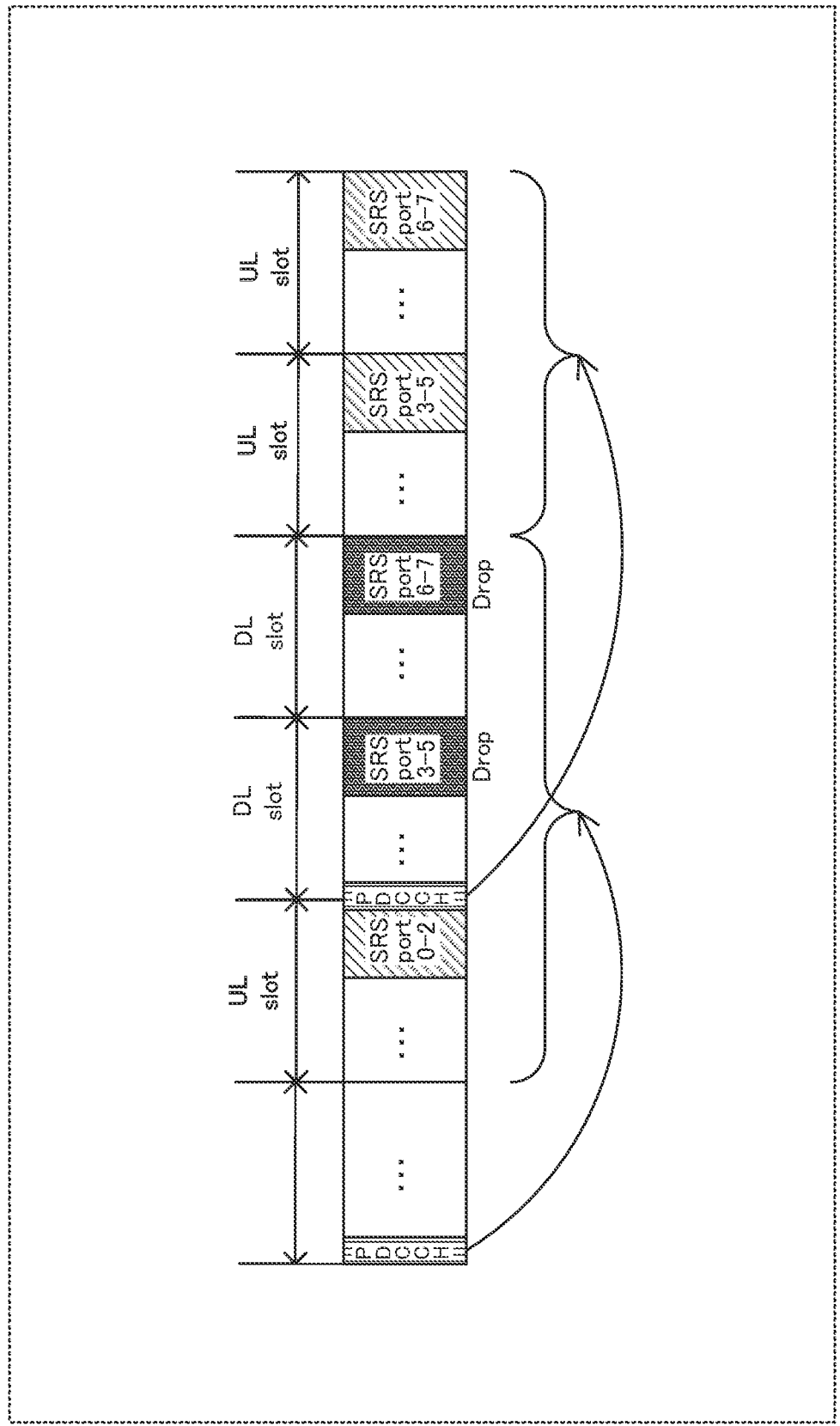
FIG. 13 illustrates another example of re-triggering Aperiodic SRS transmission on the terminal of 1T8R.

FIG. 13 illustrates an example of triggering Aperiodic SRS transmission using three slots. In FIG. 13, for example, among the three slots used for the Aperiodic SRS transmission, the second slot (e.g., SRS ports #3 to 5) and the third slot (e.g., SRS ports #6 and 7) are changed from uplink slots to downlink slots, and terminal 200 does not perform (e.g., Drops) the Aperiodic SRS transmission therein.

In this case, base station 100 may re-trigger the Aperiodic SRS transmission on terminal 200. When re-triggering the Aperiodic SRS transmission, in FIG. 13, for example, base station 100 can trigger the SRS transmission in the second slot and the third slot by trigger information=2 indicated in FIG. 11. That is, base station 100 does not trigger the SRS transmission in the first slot in which the Aperiodic SRS is transmitted from terminal 200.

As described above, in the present embodiment, base station 100 transmits trigger information indicating some of a plurality of slots (e.g., candidate unit time resources) for the Aperiodic SRS transmission by terminal 200, and terminal 200 receives the trigger information. Thus, in the Aperiodic SRS transmission using the plurality of slots, base station 100 can dynamically indicate SRS transmission in some of the slots to terminal 200.

Therefore, for example, even when the SRS transmission is not performed in some of the slots among the plurality of slots used for the SRS transmission, it is unnecessary to re-trigger the SRS transmission using the slot in which the SRS transmission has been performed (i.e., slot that does not need to be re-triggered), which can improve the transmission efficiency of an SRS. As described above, according to the present embodiment, base station 100 can flexibly schedule the Aperiodic SRS transmission to terminal 200, for example, suppress an increase in an overhead due to the SRS transmission, thereby improving the system performance in uplink.

An exemplary embodiment of the present disclosure has been described, thus far.

In the present embodiment, a use case of an SRS is not limited to the "Antenna switching" in which terminal 200 switches an antenna port for transmitting an Aperiodic SRS for each of a plurality of slots. For example, the present embodiment may be applied to Aperiodic SRS transmission for transmission by switching an antenna port over a plurality of slots, such as Beam management for controlling an uplink transmission antenna port.

Further, in the present embodiment, as illustrated in FIG. 10, for example, a case has been described where, in an SRS resource in an SRS resource set, a transmission antenna port number is explicitly configured, but the transmission antenna port number may not be explicitly configured for the SRS resource. For example, the antenna port number corresponding to the SRS resource may be implicitly recognized between base station 100 and terminal 200. In one example, in a case where an Aperiodic SRS for an Antenna switching use case is configured for terminal 200 of 1T8R, eight SRS resources may be configured by a plurality of SRS resource sets. In this case, terminal 200 may, for example, determine a transmission antenna port number in the order from the earliest SRS symbol for which a transmission resource is configured, based on a slot offset and a transmission symbol position to be configured. Alternatively, a transmission antenna port number may be explicitly included in an SRS resource. Thus, for example, the relation between an SRS resource and an antenna port number as illustrated in FIG. 10 can be recognized between base station 100 and terminal 200.

Further, for example, in a case where terminal 200 drops (i.e., when stopping transmission) the SRS transmission in a portion of the slots among the plurality of slots in which the Aperiodic SRS transmission is triggered, terminal 200 may not change the antenna port (i.e., association between slot and antenna port) used for the SRS transmission in each slot. For example, the plurality of slots in which the Aperiodic SRS transmission is triggered and an SRS transmission antenna port may be associated with each other. Base station 100 and terminal 200 may, for example, determine an antenna port to be used for transmitting an SRS in each of the portion of the slots based on the association of each of the plurality of slots with a transmission antenna port.

Figure 14:
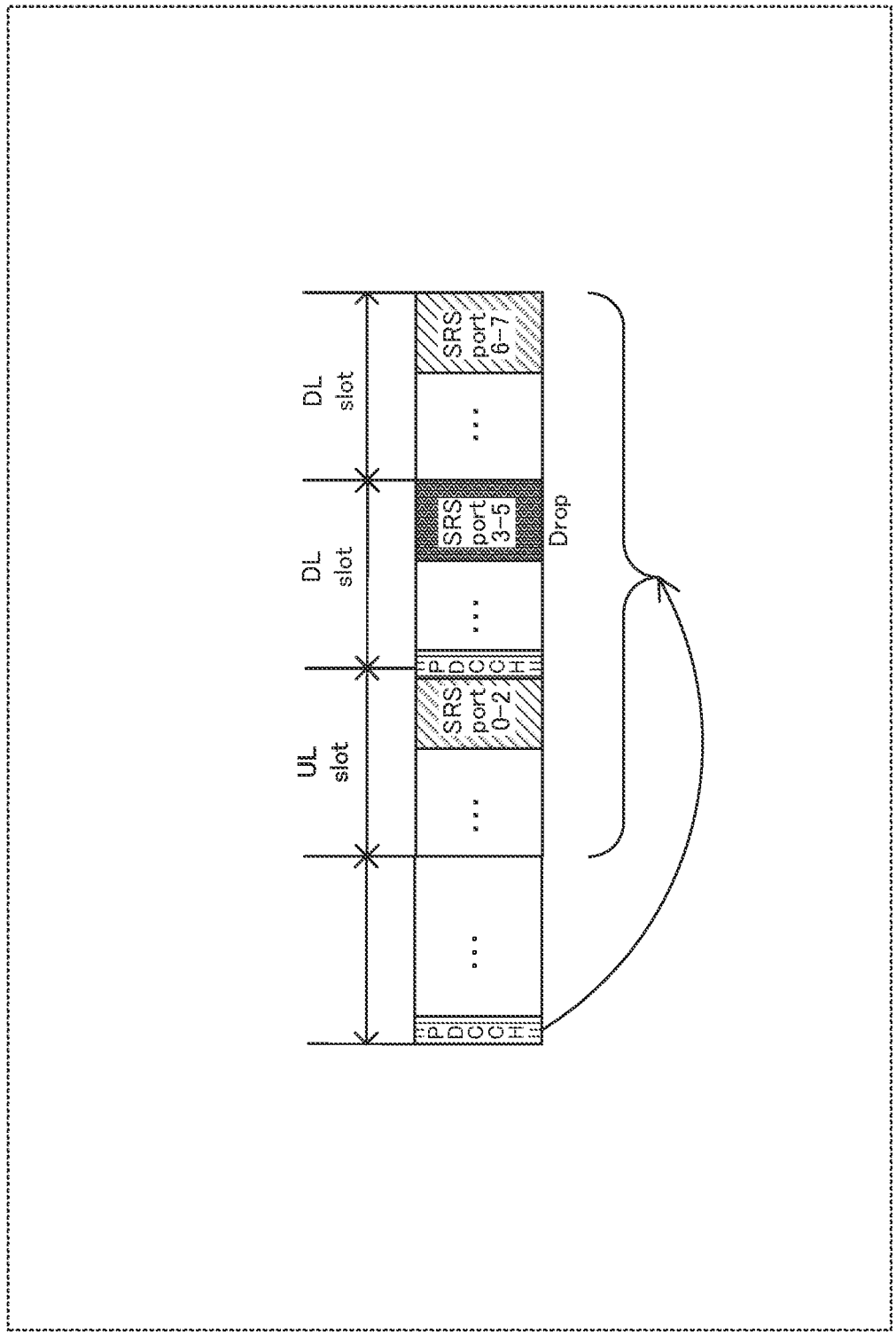
FIG. 14 illustrates yet another example of re-triggering Aperiodic SRS transmission on the terminal of 1T8R.

FIG. 14 illustrates an example of triggering Aperiodic SRS transmission on terminal 200 of 1T8R. In FIG. 14, terminal 200 drops the SRS in the second slot and transmits the SRSs in the first slot and the third slot. In this case, in the SRS transmission in the third slot, terminal 200 may transmit SRSs in the order from antenna port number 6 associated with the SRS resource in the third slot, instead of transmitting SRSs in the order from antenna port number 3 corresponding to the dropped SRS. For example, it is difficult for base station 100 to grasp a reception error (or reception error) of a PDCCH (or DCI) at terminal 200. As mentioned above, when each slot used by terminal 200 for the SRS transmission and an antenna port number used in each slot is previously associated, base station 100 can, for example, suppress an occurrence of the recognition error of the antenna port number between base station 100 and terminal 20 even in a case of re-triggering the SRS transmission in the second slot in FIG. 14.

Incidentally, the rule in the dropping mentioned above (rule that antenna port used for SRS transmission in each slot is not changed even when some of slots are dropped) is applied not only to an Aperiodic SRS but also to a case where the transmission is performed by switching an antenna port over a plurality of slots in a Semi-Persistent SRS or a Periodic SRS.

Further, in an exemplary embodiment of the present disclosure, the terminal of 1T4R or 1T8R has been described, but the number of transmission antenna ports and the number of reception antenna ports which are simultaneously processible are not limited to this example. Further, a symbol position at which an SRS is positioned is not limited to the above-mentioned examples.

Further, in an exemplary embodiment of the present disclosure, an object of the resource information such as a transmission antenna port or a symbol position is not limited to a reference signal such as an SRS and may be other signals (or information). In one example, an exemplary embodiment of the present disclosure may be applied to, instead of the SRS, a response signal (e.g., also referred to as ACK/NACK or HARQ-ACK) to data.

Further, in an exemplary embodiment of the present disclosure, a case has been described where the SRS configuration information is configured for terminal 200 by higher layer signaling (e.g., RRC layer signaling), but the configuration of the SRS configuration information is not limited to the configuration by the higher layer signaling and may be by other signaling (e.g., physical layer signaling). Moreover, a case has been described where the trigger information is indicated by the DCI to terminal 200, but the trigger information may be indicated, to terminal 200, by a signal (or information) different from the DCI.

(Control Signal)

In an exemplary embodiment of the present disclosure, the downlink control signal (or downlink control information) may be, for example, a signal (or information) transmitted at a Physical Downlink Control Channel (PDCCH) in the physical layer, or a signal (or information) transmitted at Medium Access Control (MAC) or Radio Resource Control (RRC) in the higher layer. In addition, the signal (or information) is not limited to a case of being indicated by the downlink control signal and may be previously specified by the specifications (or standards) or may be previously configured in a base station and a terminal.

In an exemplary embodiment of the present disclosure, the uplink control signal (or uplink control information) may be, for example, a signal (or information) transmitted in a PDCCH in the physical layer, or a signal (or information) transmitted in MAC or RRC in the higher layer. In addition, the signal (or information) is not limited to a case of being indicated by the uplink control signal and may be previously specified by the specifications (or standards) or may be previously configured in a base station and a terminal. Further, the uplink control signal may be replaced with, for example, uplink control information (UCI), 1st stage sidelink control information (SCI), or 2nd stage SCI.

(Base Station)

In an exemplary embodiment of the present disclosure, the base station may be a transmission reception point (TRP), a clusterhead, an access point, a remote radio head (RRH), an eNodeB (eNB), a gNodeB (gNB), a base station (BS), a base transceiver station (BTS), a base unit, or a gateway, for example. In addition, in sidelink communication, a terminal may be adopted instead of abase station. Further, instead of abase station, a relay apparatus may be adopted for relaying the communication between a higher node and a terminal.

(Uplink/Downlink/Sidelink)

An exemplary embodiment of the present disclosure may be applied to, for example, any of the uplink, downlink, and sidelink. In one example, an exemplary embodiment of the present disclosure may be applied to a Physical Uplink Shared Channel (PUSCH), a Physical Uplink Control Channel (PUCCH), and a Physical Random Access Channel (PRACH) in uplink, a Physical Downlink Shared Channel (PDSCH), a PDCCH, and a Physical Broadcast Channel (PBCH) in downlink, or a Physical Sidelink Shared Channel (PSSCH), a Physical Sidelink Control Channel (PSCCH), and a Physical Sidelink Broadcast Channel (PSBCH) in sidelink.

The PDCCH, the PDSCH, the PUSCH, and the PUCCH are examples of a downlink control channel, a downlink data channel, an uplink data channel, and an uplink control channel, respectively. Further, the PSCCH and the PSSCH are examples of a side link control channel and a side link data channel, respectively. Further, the PBCH and the PSBCH are examples of a broadcast channel, and the PRACH is an example of a random access channel.

(Data Channel/Control Channel)

An exemplary embodiment of the present disclosure may be applied to, for example, any of a data channel and a control channel. In one example, a channel in an exemplary embodiment of the present disclosure may be replaced with any of a PDSCH, a PUSCH, and a PSSCH for the data channel, or a PDCCH, a PUCCH, a PBCH, a PSCCH, and a PSBCH for the control channel.

(Reference Signal)

In an exemplary embodiment of the present disclosure, the reference signals are signals known to both a base station and a mobile station and each reference signal may be referred to as a reference signal (RS) or sometimes a pilot signal. Each reference signal may be any of: a Demodulation Reference Signal (DMRS): a Channel State Information-Reference Signal (CSI-RS); a Tracking Reference Signal (TRS); a Phase Tracking Reference Signal (PTRS); a Cell-specific Reference Signal (CRS); or a Sounding Reference Signal (SRS).

(Time Interval)

In an exemplary embodiment of the present disclosure, time resource units are not limited to one or a combination of slots and symbols and may be time resource units, such as frames, superframes, subframes, slots, time slot subslots, minislots, or time resource units, such as symbols, orthogonal frequency division multiplexing (OFDM) symbols, single carrier-frequency division multiplexing access (SC-FDMA) symbols, or other time resource units. The number of symbols included in one slot is not limited to any number of symbols exemplified in the embodiments described above and may be other numbers of symbols.

(Frequency Band)

An exemplary embodiment of the present disclosure may be applied to either of a licensed band or an unlicensed band.

(Communication)

An exemplary embodiment of the present disclosure may be applied to any of the communication between a base station and a terminal, the communication between terminals (Sidelink communication, Uu link communication), and the communication for Vehicle to Everything (V2X). In one example, a channel in an exemplary embodiment of the present disclosure may be replaced with any of a PSCCH, a PSSCH, a Physical Sidelink Feedback Channel (PSFCH), a PSBCH, a PDCCH, a PUCCH, a PDSCH, a PUSCH, and a PBCH.

Further, an exemplary embodiment of the present disclosure may be applied to either of terrestrial networks or a non-terrestrial network (NTN) such as communication using a satellite or a high-altitude pseudolite (High Altitude Pseudo Satellite (HAPS)). Further, an exemplary embodiment of the present disclosure may be applied to a terrestrial network having a large transmission delay compared to the symbol length or slot length, such as a network with a large cell size and/or an ultra-wideband transmission network.

(Antenna Port)

In an exemplary embodiment of the present disclosure, the antenna port refers to a logical antenna (antenna group) configured of one or more physical antennae. For example, the antenna port does not necessarily refer to one physical antenna and may refer to an array antenna or the like configured of a plurality of antennae. In one example, the number of physical antennae configuring the antenna port may not be specified, and the antenna port may be specified as the minimum unit with which a terminal station can transmit a Reference signal. Moreover, the antenna port may be specified as the minimum unit for multiplying a weight of a Precoding vector.

<5G NR System Architecture and Protocol Stack>

3GPP has been working on the next release for the 5th generation cellular technology (simply called "5G"), including the development of a new radio access technology (NR) operating in frequencies ranging up to 100 GHz. The first version of the 5G standard was completed at the end of 2017, which allows proceeding to 5G NR standard-compliant trials and commercial deployments of terminals (e.g., smartphones).

Figure 15:
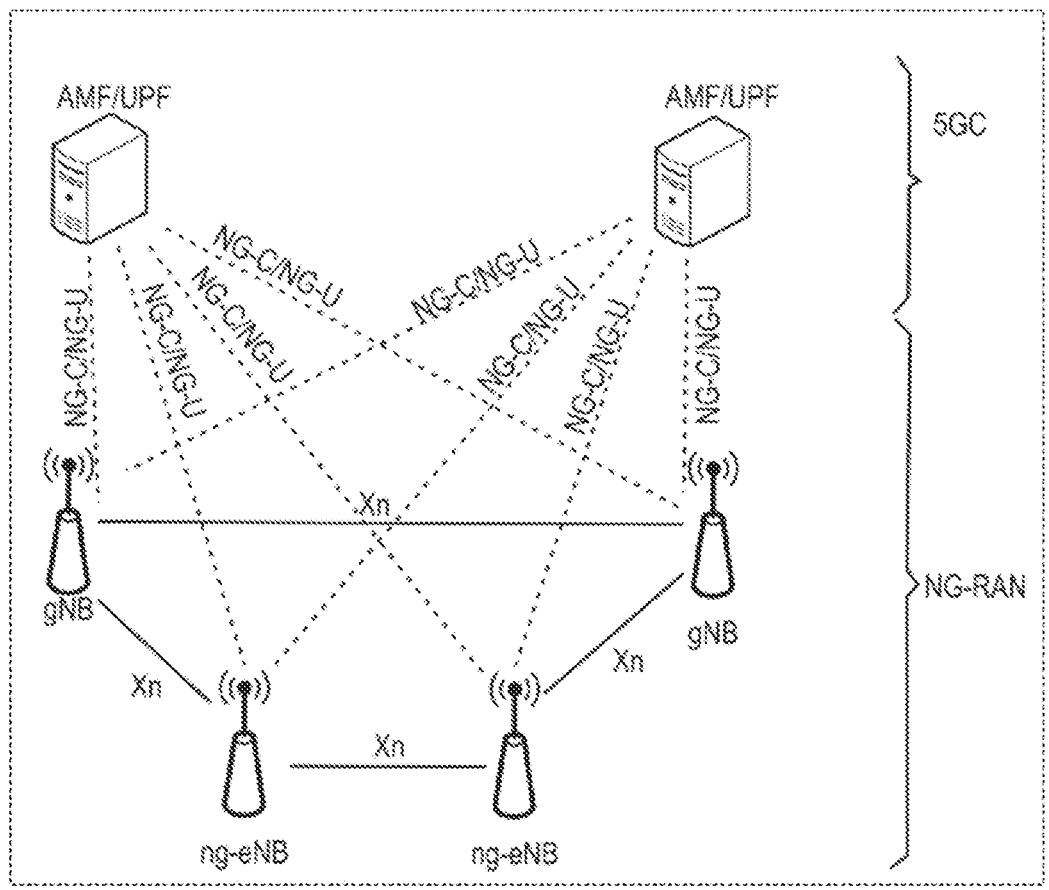
FIG. 15 illustrates an exemplary architecture of a 3GPP NR system.

For example, the overall system architecture assumes an NG-RAN (Next Generation-Radio Access Network) that includes gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function)(e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 15 (see e.g., 3GPP TS 38.300 v15.6.0, section 4).

The user plane protocol stack for NR (see e.g., 3GPP TS 38.300, section 4.4.1) includes the PDCP (Packet Data Convergence Protocol, see clause 6.4 of TS 38.300). RLC (Radio Link Control, see clause 6.3 of TS 38.300) and MAC (Medium Access Control, see clause 6.2 of TS 38.300) sublayers, which are terminated in the gNB on the network side. Additionally, a new Access Stratum (AS) sublayer (SDAP, Service Data Adaptation Protocol) is introduced above the PDCP (see e.g., clause 6.5 of 3GPP TS 38.300). A control plane protocol stack is also defined for NR (see for instance TS 38.300, section 4.4.2). An overview of the Layer 2 functions is given in clause 6 of TS 38.300. The functions of the PDCP, RLC, and MAC sublayers are listed respectively in clauses 6.4, 6.3, and 6.2 of TS 38.300. The functions of the RRC layer are listed in clause 7 of TS 38.300.

For instance, the Medium Access Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. The physical layer also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. Examples of the physical channel include a Physical Random Access Channel (PRACH), a Physical Uplink Shared Channel (PUSCH), and a Physical Uplink Control Channel (PUCCH) as uplink physical channels, and a Physical Downlink Shared Channel (PDSCH), a Physical Downlink Control Channel (PDCCH), and a Physical Broadcast Channel (PBCH) as downlink physical channels.

Use cases/deployment scenarios for NR could include enhanced mobile broadband (eMBB), ultra-reliable low-latency communications (URLLC), and massive machine type communication (mMTC), which have diverse requirements in terms of data rates, latency, and coverage. For example, eMBB is expected to support peak data rates (20 Gbps for downlink and 10 Gbps for uplink) and user-experienced data rates on the order of three times what is offered by IMT-Advanced. On the other hand, in case of URLLC, the tighter requirements are put on ultra-low latency (0.5 ms for UL and DL each for user plane latency) and high reliability (1-10-5 within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, and number of symbols per scheduling interval) that is suitable for one use case might not work well for another. For example, low-latency services may preferably require a shorter symbol duration (and thus larger subcarrier spacing) and/or fewer symbols per scheduling interval (aka. TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacings of 15 kHz, 30 kHz, and 60 kHz . . . are being considered at the moment. The symbol duration Tu and the subcarrier spacing $\Delta f$ are directly related through the formula $\Delta f=1/Tu$. In a similar manner as in LTE systems, the term "resource element" can be used to denote a minimum resource unit being composed of one subcarrier for the length of one OFDM/SC-FDMA symbol.

In the new radio system 5G-NR for each numerology and each carrier, resource grids of subcarriers and OFDM symbols are defined respectively for uplink and downlink. Each element in the resource grids is called a resource element and is identified based on the frequency index in the frequency domain and the symbol position in the time domain (see 3GPP TS 38.211 v15.6.0).

<Functional Split Between NG-RAN and 5GC in 5G NR>

Figure 16:
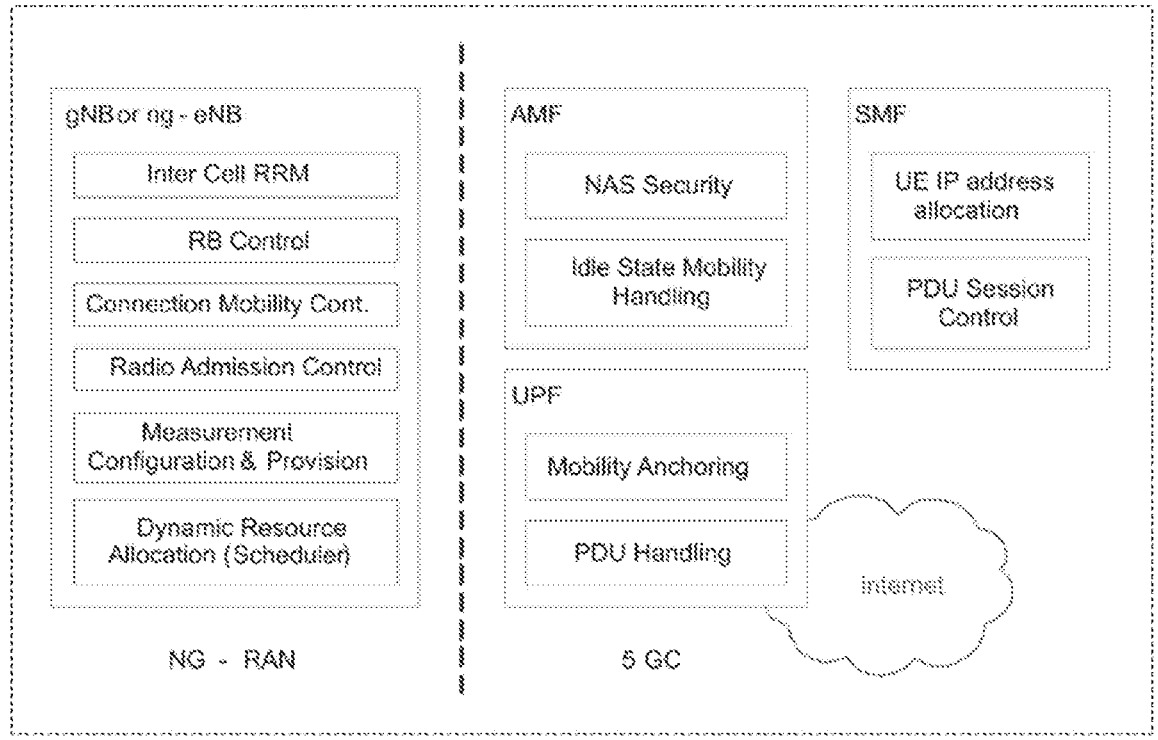
FIG. 16 schematically illustrates a functional split between Next Generation—Radio Access Network (NG-RAN) and 5th Generation Core (5GC)

FIG. 16 illustrates the functional split between the NG-RAN and the 5GC. A logical node of the NG-RAN is gNB or ng-eNB. The 5GC includes logical nodes AMF, UPF, and SMF.

For example, gNB and ng-eNB hosts the following main functions:

Radio Resource Management functions such as Radio Bearer Control, Radio Admission Control, Connection Mobility Control, and dynamic allocation (scheduling) of both uplink and downlink resources to a UE;

IP header compression, encryption, and integrity protection of data;

Selection of an AMF during UE attachment in such a case when no routing to an AMF can be determined from the information provided by the UE;

Routing user plane data towards the UPF;

Routing control plane information towards the AMF;

Connection setup and release;

Scheduling and transmission of paging messages;

Scheduling and transmission of system broadcast information (originated from the AMF or an operation management maintenance function (OAM: Operation, Admission, Maintenance));

Measurement and measurement reporting configuration for mobility and scheduling;

Transport level packet marking in the uplink;

Session management;

Support of network slicing;

QoS flow management and mapping to data radio bearers;

Support of UEs in the RRC_INACTIVE state;

Distribution function for NAS messages;

Radio access network sharing;

Dual connectivity; and

Tight interworking between NR and E-UTRA.

The Access and Mobility Management Function (AMF) hosts the following main functions:

Function of Non-Access Stratum (NAS) signaling termination;

NAS signaling security;

Access Stratum (AS) security control;

Inter-Core Network (CN) node signaling for mobility between 3GPP access networks;

Idle mode UE reachability (including control and execution of paging retransmission);

Registration area management;

Support of intra-system and inter-system mobility;

Access authentication;

Access authorization including check of roaming rights;

Mobility management control (subscription and policies);

Support of network slicing; and

Session Management Function (SMF) selection.

In addition, the User Plane Function (UPF) hosts the following main functions:

Anchor Point for intra-/inter-RAT mobility (when applicable);

External Protocol Data Unit (PDU) session point for interconnection to a data network;

Packet routing and forwarding;

Packet inspection and a user plane part of Policy rule enforcement;

Traffic usage reporting;

Uplink classifier to support routing traffic flows to a data network;

Branching point to support multi-homed PDU session;

QoS handling for user plane (e.g., packet filtering, gating, UL/DL rate enforcement);

Uplink traffic verification (SDF to QoS flow mapping); and

Function of downlink packet buffering and downlink data notification triggering.

Finally, the Session Management Function (SMF) hosts the following main functions:
Session management;
UE IP address allocation and management;
Selection and control of UPF;
Configuration function for traffic steering at the User Plane Function (UPF) to route traffic to a proper destination;
Control part of policy enforcement and QoS; and
Downlink data notification.

<RRC Connection Setup and Reconfiguration Procedure>

Figure 17:
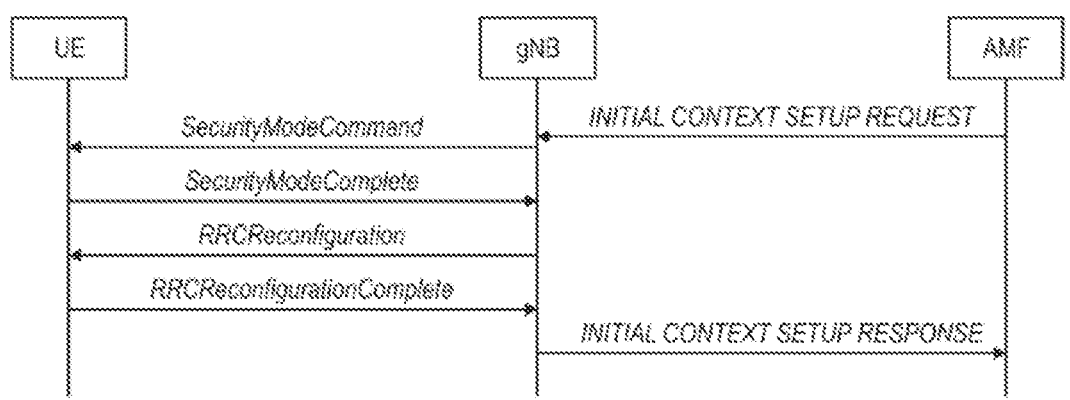
FIG. 17 is a sequence diagram of a Radio Resource Control (RRC) connection setup/reconfiguration procedure.

FIG. 17 illustrates some interactions between a UE, gNB, and AMF (a 5GC Entity) performed in the context of a transition of the UE from RRC_IDLE to RRC_CONNECTED for the NAS part (see TS 38 300 v15.6.0).

The RRC is higher layer signaling (protocol) used to configure the UE and gNB. With this transition, the AMF prepares UE context data (which includes, for example, a PDU session context, security key, UE Radio Capability, UE Security Capabilities, and the like) and sends it to the gNB with an INITIAL CONTEXT SETUP REQUEST. Then, the gNB activates the AS security with the UE. This activation is performed by the gNB transmitting to the UE a SecurityModeCommand message and by the UE responding to the gNB with the SecurityModeComplete message. Afterwards, the gNB performs the reconfiguration to setup the Signaling Radio Bearer 2 (SRB2) and Data Radio Bearer(s) (DRB(s)) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not set up. Finally, the gNB notifies the AMF that the setup procedure is completed with INITIAL CONTEXT SETUP RESPONSE.

Thus, the present disclosure provides a 5th Generation Core (5GC) entity (e.g., AMF, SMF, or the like) including control circuitry, which, in operation, establishes a Next Generation (NG) connection with a gNodeB, and a transmitter, which in operation, transmits an initial context setup message to the gNodeB via the NG connection such that a signaling radio bearer between the gNodeB and a User Equipment (UE) is set up. Specifically, the gNodeB transmits Radio Resource Control (RRC) signaling including a resource allocation configuration Information Element (IE) to the UE via the signaling radio bearer. Then, the UE performs an uplink transmission or a downlink reception based on the resource allocation configuration.

<Usage Scenarios of IMT for 2020 and Beyond>

Figure 18:
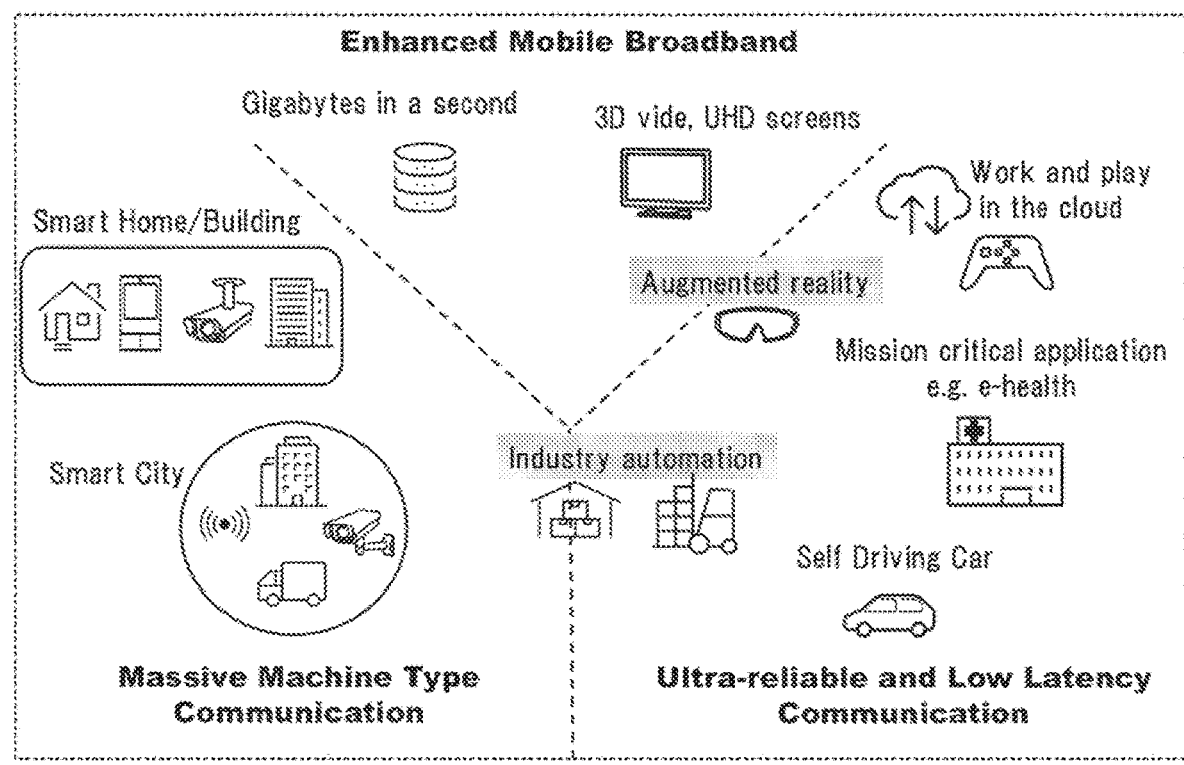
FIG. 18 schematically illustrates usage scenarios of enhanced Mobile BroadBand (eMBB), massive Machine Type Communications (mMTC), and Ultra Reliable and Low Latency Communications (URLLC)

FIG. 18 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications (mMTC). FIG. 18 illustrates some examples of envisioned usage scenarios for IMT for 2020 and beyond (see e.g., ITU-R M.2083 FIG. 2).

The URLLC use case has stringent requirements for capabilities such as throughput, latency and availability. The URLLC use case has been envisioned as one of the enablers for future vertical applications such as wireless control of industrial manufacturing or production processes, remote medical surgery, distribution automation in a smart grid, transportation safety. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a block error rate (BLER) of 1 E−5 for a packet size of 32 bytes with a user plane latency of 1 ms.

From the physical layer perspective, reliability can be improved in a number of possible ways. The current scope for improving the reliability involves defining separate CQI tables for URLLC, more compact DCI formats, repetition of PDCCH, or the like. However, the scope may widen for achieving ultra-reliability as the NR becomes more stable and developed (for NR URLLC key requirements). Particular use cases of NR URLLC in Rel. 15 include Augmented Reality/Virtual Reality (AR/VR), e-health, e-safety, and mission-critical applications.

Moreover, technology enhancements targeted by NR URLLC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLLC) may be pre-empted by a transmission for a service type B (such as eMBB). Technology enhancements with respect to reliability improvement include dedicated CQI/MCS tables for the target BLER of 1 E−5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, for example, for URLLC and mMTC, is high reliability or ultra-reliability. Several mechanisms can improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability improvement in general, regardless of particular communication scenarios.

For NR URLLC, further use cases with tighter requirements have been envisioned such as factory automation, transport industry and electrical power distribution. The tighter requirements are higher reliability (up to 10-6 level), higher availability, packet sizes of up to 256 bytes, time synchronization up to the extent of a few μs (where the value can be one or a few μs depending on frequency range and short latency on the order of 0.5 to 1 ms (in particular a target user plane latency of 0.5 ms), depending on the use cases).

Moreover, for NR URLLC, several technology enhancements from physical layer perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements are possible. The term "mini-slot" refers to a Transmission Time Interval (TTI) including a smaller number of symbols than a slot (a slot comprising fourteen symbols).

<QoS Control>

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU sessions. For each UE, the NG-RAN establishes at least one Data Radio Bearer (DRB) together with the PDU session. e.g., as illustrated above with reference to FIG. 17. Further, additional DRB(s) for QoS flow(s) of that PDU session can be subsequently configured (it is up to NG-RAN when to do so). The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 19:
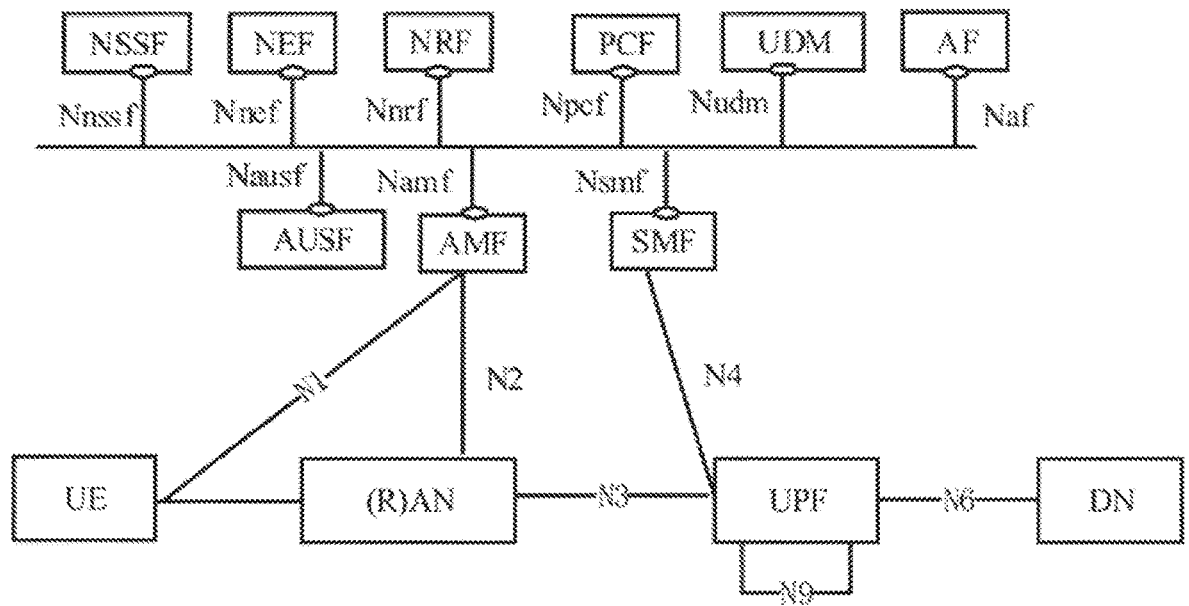
FIG. 19 is a block diagram illustrating an exemplary 5G system architecture for a non-roaming scenario.

FIG. 19 illustrates a 5G NR non-roaming reference architecture (see TS 23.501 v16.1.0, section 4.23). An Application Function (AF) (e.g., an external application server hosting 5G services, exemplarily described in FIG. 18) interacts with the 3GPP Core Network in order to provide services, for example to support application influencing on traffic routing, accessing Network Exposure Function (NEF) or interacting with the policy framework for policy control (e.g., QoS control) (see Policy Control Function, PCF). Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 19 illustrates further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN, e.g., operator services, Internet access, or third party services). All of or a part of the core network functions and the application services may be deployed and running on cloud computing environments.

In the present disclosure, thus, an application server (e.g., AF of the 5G architecture), is provided that includes: a transmitter, which in operation, transmits a request containing a QoS requirement for at least one of URLLC, eMMB and mMTC services to at least one of functions (such as NEF, AMF, SMF, PCF, and UPF) of the 5GC to establish a PDU session including a radio bearer between a gNodeB and a UE in accordance with the QoS requirement; and control circuitry, which, in operation, performs the services using the established PDU session.

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. The communication apparatus may comprise a transceiver and processing/control circuitry. The transceiver may comprise and/or function as a receiver and a transmitter. The transceiver, as the transmitter and receiver, may include an RF (radio frequency) module and one or more antennas. The RF module may include an amplifier, an RF modulator/demodulator, or the like. Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as, e.g., a base station, an access point, and any other apparatus, device or system that communicates with or controls apparatuses such as those in the above non-limiting examples.

A terminal according to an exemplary embodiment of the present disclosure includes: reception circuitry, which, in operation, receives first information on a transmission indication, to a reference signal for which transmission in a plurality of candidate unit time intervals is configured, for a portion of the plurality of candidate unit time intervals; and control circuitry, which, in operation, controls, based on the first information, the transmission of the reference signal.

In an exemplary embodiment of the present disclosure, the reception circuitry receives second information including resource information on each of the plurality of candidate unit time intervals, and the resource information on each of the portion of the plurality of candidate unit time intervals is associated with the same value among a plurality of values represented by a bit of the first information.

In an exemplary embodiment of the present disclosure, the reception circuitry receives second information including resource information on each of the plurality of candidate unit time intervals, the resource information on each of the plurality of candidate unit time intervals is associated with any of a plurality of values represented by a bit of the first information, and, among the plurality of candidate unit time intervals, a number of the values that are associated varies between a first unit time interval and a second unit time interval.

In an exemplary embodiment of the present disclosure, a use case of the reference signal is Antenna switching in the plurality of candidate unit time intervals.

In an exemplary embodiment of the present disclosure, the control circuitry determines an antenna port used for the transmission of the reference signal in each of the portion of the plurality of candidate unit time intervals, based on an association between each of the plurality of candidate unit time intervals and the antenna port.

A base station according to an exemplary embodiment of the present disclosure includes: transmission circuitry, which, in operation, transmits information on a transmission indication, to a reference signal for which transmission in a plurality of candidate unit time intervals by a terminal is configured, for a portion of the plurality of candidate unit time intervals; and control circuitry, which, in operation, controls, based on the information, reception of the reference signal.

A communication method according to an exemplary embodiment of the present disclosure includes: receiving, by a terminal, information on a transmission indication, to a reference signal for which transmission in a plurality of candidate unit time intervals is configured, for a portion of the plurality of candidate unit time intervals; and controlling, by the terminal, based on the information, the transmission of the reference signal.

A communication method according to an exemplary embodiment of the present disclosure includes: transmitting, by a base station, information on a transmission indication, to a reference signal for which transmission in a plurality of candidate unit time intervals by a terminal is configured, for a portion of the plurality of candidate unit time intervals; and controlling, by the base station, based on the information, reception of the reference signal.

The disclosure of Japanese Patent Application No. 2020-121432, filed on Jul. 15, 2020, including the specification, drawings and abstract, is incorporated herein by reference in its entirety.

INDUSTRIAL APPLICABILITY

An exemplary embodiment of the present disclosure is useful for radio communication systems.

REFERENCE SIGNS LIST

100 Base station
101, 203 Controller
102 Encoder/modulator
103, 206 Transmission processor
104, 207 Transmitter
105, 201 Receiver
106, 202 Reception processor
107 Data signal receiver
108 Reference signal receiver
200 Terminal
204 Reference signal generator
205 Data signal generator

The invention claimed is:

1. A terminal, comprising:
reception circuitry, which, in operation, receives information on an indication of a portion of a plurality of candidate unit time resources for aperiodic transmission of a reference signal; and
control circuitry, which, in operation, controls, based on the information, allocation of a time resource used for the aperiodic transmission of the reference signal, wherein
the control circuitry;
determines an antenna port used for transmitting the reference signal in each of the portion of the plurality of candidate unit time resources, based on an association between each of the plurality of candidate unit time resources and the antenna port; and
does not change the association in a case where the reference signal is dropped in at least one candidate unit time resource among the plurality of candidate unit time resources.

2. The terminal according to claim 1, wherein:
the reception circuitry receives information on each of the plurality of candidate unit time resources, and
the information on each of the portion of the plurality of candidate unit time resources is associated with the same value among a plurality of values represented by a bit of the information on the indication.

3. The terminal according to claim 1, wherein:
the reception circuitry receives information on each of the plurality of candidate unit time resources,
the information on each of the plurality of candidate unit time resources is associated with any of a plurality of values represented by a bit of the information on the indication, and
among the plurality of candidate unit time resources, a number of the values that are associated varies between information on a first unit time resource and a second unit time resource which is different from the first unit time resource.

4. The terminal according to claim 1, wherein the control circuitry switches the antenna port from which the reference signal is transmitted, for each of the plurality of candidate unit time resources.

5. A base station, comprising:
transmission circuitry, which, in operation, transmits information on an indication of a portion of a plurality of candidate unit time resources for aperiodic transmission of a reference signal by a terminal; and
control circuitry, which, in operation, controls, based on the information, allocation of a time resource used for reception of the reference signal, wherein
the terminal;
determines an antenna port used for transmitting the reference signal in each of the portion of the plurality of candidate unit time resources, based on an association between each of the plurality of candidate unit time resources and the antenna port; and
does not change the association in a case where the reference signal is dropped in at least one candidate unit time resource among the plurality of candidate unit time resources.

6. A communication method, comprising:
receiving, by a terminal, information on an indication of a portion of a plurality of candidate unit time resources for aperiodic transmission of a reference signal;
controlling, by the terminal, based on the information, allocation of a time resource used for the aperiodic transmission of the reference signal;
determining an antenna port used for transmitting the reference signal in each of the portion of the plurality of candidate unit time resources, based on an association between each of the plurality of candidate unit time resources and the antenna port; and
not changing the association in a case where the reference signal is dropped in at least one candidate unit time resource among the plurality of candidate unit time resources.

7. A communication method, comprising:
transmitting, by a base station, information on an indication of a portion of a plurality of candidate unit time resources for aperiodic transmission of a reference signal by a terminal; and
controlling, by the base station, based on the information, allocation of a time resource used for reception of the reference signal; wherein
the terminal;
determines an antenna port used for transmitting the reference signal in each of the portion of the plurality of candidate unit time resources, based on an association between each of the plurality of candidate unit time resources and the antenna port; and
does not change the association in a case where the reference signal is dropped in at least one candidate unit time resource among the plurality of candidate unit time resources.

* * * * *